(12) United States Patent
Yavuz et al.

(10) Patent No.: US 11,304,099 B2
(45) Date of Patent: *Apr. 12, 2022

(54) SYSTEMS AND METHODS OF RECOMMENDING A DATA RATE IN A WIRELESS COMMUNICATIONS SYSTEM

(71) Applicant: Telefonaktiebolaget LM Ericsson (publ), Stockholm (SE)

(72) Inventors: Emre Yavuz, Stockholm (SE); Anders K Eriksson, Uppsala (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/841,366

(22) Filed: Apr. 6, 2020

(65) Prior Publication Data

US 2020/0236593 A1 Jul. 23, 2020

Related U.S. Application Data

(63) Continuation of application No. 16/097,975, filed as application No. PCT/SE2017/050490 on May 12, 2017, now Pat. No. 10,659,995.

(Continued)

(51) Int. Cl.
*H04W 4/00* (2018.01)
*H04W 28/22* (2009.01)
(Continued)

(52) U.S. Cl.
CPC ......... *H04W 28/22* (2013.01); *H04L 65/1006* (2013.01); *H04L 65/608* (2013.01);
(Continued)

(58) Field of Classification Search
CPC . H04W 28/22; H04W 28/0205; H04W 80/02; H04W 80/08; H04L 65/1006; H04L 65/608; H04L 605/80
(Continued)

(56) References Cited

U.S. PATENT DOCUMENTS 5,838,690 A * 11/1998 Kano ................... H04L 12/4625
370/468
6,366,761 B1 * 4/2002 Montpetit .............. H04B 7/195
370/230

(Continued)

FOREIGN PATENT DOCUMENTS

CN 102883372 A 1/2013

*Primary Examiner* — Thai D Hoang
(74) *Attorney, Agent, or Firm* — Coats & Bennett, PLLC

(57) ABSTRACT

Systems and methods for recommending a data rate on an uplink or downlink communication channel between the network node and a wireless device in a wireless communications system are provided. In one exemplary embodiment, a method performed by a wireless device for recommending a data rate on an uplink or downlink communication channel between the wireless device and a network node in a wireless communications system comprises determining to request that the network node recommend a data rate on the uplink or downlink communication channel for the wireless device. Further, the method includes generating a first information element that indicates the request. Also, the first information element is sent via a protocol layer on the uplink communication channel.

15 Claims, 19 Drawing Sheets

Related U.S. Application Data

(60) Provisional application No. 62/336,546, filed on May 13, 2016.

(51) Int. Cl.
   *H04L 65/80* (2022.01)
   *H04W 28/02* (2009.01)
   *H04W 80/02* (2009.01)
   *H04L 65/10* (2022.01)
   *H04L 65/65* (2022.01)
   *H04W 80/08* (2009.01)
   *H04L 69/324* (2022.01)

(52) U.S. Cl.
   CPC ......... *H04L 65/80* (2013.01); *H04W 28/0205* (2013.01); *H04W 80/02* (2013.01); *H04W 80/08* (2013.01); *H04L 69/324* (2013.01)

(58) Field of Classification Search
   USPC .................. 370/329–330, 335–345, 348–349
   See application file for complete search history.

(56) References Cited

U.S. PATENT DOCUMENTS

| | | | | |
|---|---|---|---|---|
| 6,374,288 B1* | 4/2002 | Bhagavath | .......... | H04L 12/2856 375/222 |
| 6,781,956 B1* | 8/2004 | Cheung | .................. | H04L 47/10 370/235.1 |
| 6,882,634 B2* | 4/2005 | Bagchi | .................. | H04L 12/413 370/338 |
| 8,797,976 B2* | 8/2014 | Hyoudou | ................ | H04L 47/10 370/329 |
| 8,914,497 B1* | 12/2014 | Xiao | ...................... | H04L 47/78 709/224 |
| 10,659,995 B2* | 5/2020 | Yavuz | .................... | H04W 80/08 |
| 2002/0021678 A1* | 2/2002 | Heatwole | ................ | H04L 47/10 370/325 |
| 2004/0160922 A1* | 8/2004 | Nanda | .................... | H04W 28/22 370/335 |
| 2008/0240146 A1* | 10/2008 | Singh | ................ | H04N 21/43637 370/458 |
| 2010/0085942 A1* | 4/2010 | Oota | ....................... | H04L 47/10 370/332 |
| 2010/0202354 A1* | 8/2010 | Ho | .......................... | G06Q 10/06 370/328 |
| 2011/0013717 A1* | 1/2011 | Josiam | ................ | H04L 29/0653 375/295 |
| 2011/0205997 A1* | 8/2011 | Chun | .................... | H04L 5/0053 370/329 |
| 2011/0222499 A1* | 9/2011 | Park | .................. | H04W 72/0413 370/329 |
| 2013/0058317 A1* | 3/2013 | Park | ...................... | H04L 5/0053 370/336 |
| 2013/0179291 A1* | 7/2013 | Phan | ..................... | G06Q 20/047 705/26.3 |
| 2013/0294451 A1* | 11/2013 | Li | ............................ | H04L 45/54 370/392 |
| 2014/0269626 A1* | 9/2014 | Cho | ....................... | H04L 5/0055 370/335 |
| 2016/0028467 A1* | 1/2016 | Fujiwara | ............... | H04W 28/20 370/315 |
| 2016/0135219 A1* | 5/2016 | Jain | ....................... | H04W 36/26 370/329 |
| 2019/0215781 A1* | 7/2019 | Jeon | ...................... | H04W 52/241 |
| 2019/0253986 A1* | 8/2019 | Jeon | ...................... | H04W 72/042 |
| 2021/0120456 A1* | 4/2021 | Choi | ...................... | H04L 65/1006 |
| 2021/0127305 A1* | 4/2021 | Xu | ....................... | H04L 43/0829 |
| 2021/0235492 A1* | 7/2021 | Iyer | ....................... | H04W 72/14 |

\* cited by examiner

600

```
┌─ 601
│  IN A WIRELESS DEVICE FOR ADJUSTING A DATA RATE ON AN UPLINK OR
│  DOWNLINK COMMUNICATION CHANNEL BETWEEN THE WIRELESS
│  DEVICE AND A NETWORK NODE IN A WIRELESS COMMUNICATIONS
│  SYSTEM, DETERMINE A DESIRED DATA RATE ON THE UPLINK OR
│  DOWNLINK COMMUNICATION CHANNEL BASED ON A RECOMMENDED
│  DATA RATE FOR THE CORRESPONDING COMMUNICATION CHANNEL
│  OBTAINED FROM A SECOND INFORMATION ELEMENT RECEIVED VIA A
│  PROTOCOL LAYER ON THE DOWNLINK COMMUNICATION CHANNEL FROM
│  THE NETWORK NODE
```

```
┌─ 603
│  GENERATE A FIRST INFORMATION ELEMENT THAT INDICATES THE
│  DESIRED DATA RATE, THE FIRST INFORMATION ELEMENT BEING SENT
│  TO THE NETWORK NODE VIA THE PROTOCOL LAYER ON THE UPLINK
│  COMMUNICATION CHANNEL, THE DESIRED DATA RATE BEING USED BY
│  THE NETWORK NODE TO ADJUST THE RECOMMENDED DATA RATE FOR
│  THE CORRESPONDING COMMUNICATION CHANNEL
```

```
┌ ─ ─ ─ ─ ─ ─ ─ ─ ─ ─ ─ ─ ─ ─ ─ ─ ─ ─ ─ ─ ─ ─ ─ ─ ─ ─ 605
│ TRANSMIT, TO THE NETWORK NODE, THE FIRST INFORMATION ELEMENT
│ HAVING THE DESIRED DATA RATE VIA THE PROTOCOL LAYER ON THE
│ UPLINK COMMUNICATION CHANNEL
└ ─ ─ ─ ─ ─ ─ ─ ─ ─ ─ ─ ─ ─ ─ ─ ─ ─ ─ ─ ─ ─ ─ ─ ─ ─ ─
```

FIG. 6

R/R/E/LCID SUB-HEADER

| Index I+16*K | K = 0 | K = 1 | K = 2 | K = 3 | K = 4 | K = 5 | K = 6 | K = 7 |
|---|---|---|---|---|---|---|---|---|
| I = 0 | 0 | 40 | 208 | 464 | 928 | 2176 | 4224 | 6272 |
| I = 1 | Note1 | 48 | 224 | 480 | 960 | 2304 | 4352 | 6400 |
| I = 2 | Note2 | 56 | 240 | 496 | 992 | 2432 | 4480 | 6528 |
| I = 3 | Reserved | 64 | 256 | 512 | 1024 | 2560 | 4608 | 6656 |
| I = 4 | Reserved | 72 | 272 | 544 | 1088 | 2688 | 4736 | 6784 |
| I = 5 | Reserved | 80 | 288 | 576 | 1152 | 2816 | 4864 | 6912 |
| I = 6 | Reserved | 88 | 304 | 608 | 1216 | 2944 | 4992 | 7040 |
| I = 7 | 5.2 | 96 | 320 | 640 | 1280 | 3072 | 5120 | 7168 |
| I = 8 | 5.9 | 104 | 336 | 672 | 1344 | 3200 | 5248 | 7296 |
| I = 9 | 7.2 | 112 | 352 | 704 | 1408 | 3328 | 5376 | 7424 |
| I = 10 | 8.0 | 120 | 368 | 736 | 1472 | 3456 | 5504 | 7552 |
| I = 11 | 9.6 | 128 | 384 | 768 | 1536 | 3584 | 5632 | 7680 |
| I = 12 | 13.2 | 144 | 400 | 800 | 1664 | 3712 | 5760 | 7808 |
| I = 13 | 16.4 | 160 | 416 | 832 | 1792 | 3840 | 5888 | 7936 |
| I = 14 | 24.4 | 176 | 432 | 864 | 1920 | 3968 | 6016 | 8064 |
| I = 15 | 32 | 192 | 448 | 896 | 2048 | 4096 | 6144 | 8192 |

| Codec | RAN Aggregation (Note 1) | Application Encapsulation (Note 2) | Payload | RTP Header (ROHC) | PDCP | RLC | MAC | BSR | PHR | Inter Tx Time (ms) | Total (bytes) | TBS (bits) |
|---|---|---|---|---|---|---|---|---|---|---|---|---|
| EVS 7.2kbps | 1 | 1 | 18 | 3 | 1 | 2 | 2 | 4 | 2 | 20 | 32 | 256 |
| EVS 7.2kbps | 2 | 1 | 18 | 3 | 1 | 2 | 2 | 4 | 2 | 40 | 55 | 440 |
| EVS 7.2kbps | 3 | 1 | 18 | 3 | 1 | 2 | 2 | 4 | 2 | 60 | 77 | 616 |
| EVS 7.2kbps | 4 | 1 | 18 | 3 | 1 | 2 | 2 | 4 | 2 | 80 | 99 | 792 |
| EVS 7.2kbps | 1 | 2 | 18 | 3 | 1 | 2 | 2 | 4 | 2 | 40 | 50 | 400 |
| EVS 7.2kbps | 1 | 3 | 18 | 3 | 1 | 2 | 2 | 4 | 2 | 60 | 68 | 544 |
| EVS 7.2kbps | 1 | 4 | 18 | 3 | 1 | 2 | 2 | 4 | 2 | 80 | 86 | 688 |

1901 — BY A NETWORK NODE FOR ADJUSTING A DATA RATE ON AN UPLINK OR DOWNLINK COMMUNICATION CHANNEL BETWEEN THE NETWORK NODE AND A WIRELESS DEVICE IN A WIRELESS COMMUNICATIONS SYSTEM, RECEIVE, FROM THE WIRELESS DEVICE, A FIRST INFORMATION ELEMENT THAT INDICATES A REQUEST FOR A RECOMMENDED DATA RATE BY THE WIRELESS DEVICE ON THE UPLINK OR DOWNLINK COMMUNICATION CHANNEL, THE FIRST INFORMATION ELEMENT BEING SENT VIA THE PROTOCOL LAYER ON THE UPLINK COMMUNICATION CHANNEL

1903 — OBTAIN THE REQUEST FOR THE RECOMMENDED DATA RATE FROM THE FIRST INFORMATION ELEMENT

1905 — EXTRACT A FIRST INDEX FROM THE FIRST INFORMATION ELEMENT, THE FIRST INDEX INDICATING A DESIRED DATA RATE FOR THE WIRELESS DEVICE ON THE UPLINK OR DOWNLINK COMMUNICATION CHANNEL, THE FIRST INDEX BEING AN INDEX TO A TABLE OF DATA RATES ON THE UPLINK OR DOWNLINK COMMUNICATION CHANNEL

1907 — DETERMINE THE DESIRED DATA RATE BASED ON THE FIRST INDEX

1909 — DETERMINE THE RECOMMENDED DATA RATE BASED ON THE DESIRED DATA RATE

1911 — GENERATE A SECOND INFORMATION ELEMENT THAT INDICATES THE RECOMMENDED DATA RATE, WHEREIN THE SECOND INFORMATION ELEMENT IS SENT TO THE WIRELESS DEVICE VIA A PROTOCOL LAYER ON THE DOWNLINK COMMUNICATION CHANNEL.

1913 — TRANSMIT, TO THE WIRELESS DEVICE, THE SECOND INFORMATION ELEMENT VIA THE PROTOCOL LAYER ON THE DOWNLINK COMMUNICATION CHANNEL

FIG. 19

SYSTEMS AND METHODS OF RECOMMENDING A DATA RATE IN A WIRELESS COMMUNICATIONS SYSTEM

RELATED APPLICATIONS

The present application is a continuation of U.S. patent application Ser. No. 16/097,975, which was filed on Oct. 31, 2018, which is a national stage application of PCT/SE2017/050490, which was filed on May 12, 2017, and claims benefit of U.S. Provisional Application 62/336,546, which was filed on May 13, 2016, the disclosures of each of which are incorporated herein by reference in their entirety.

FIELD OF DISCLOSURE

The present disclosure relates generally to the field of communications, and in particular to adjusting a data rate in a wireless communications system.

BACKGROUND

The Real-time Transport Protocol (RTP) is a network protocol for delivering audio and video packets over Internet Protocol (IP) networks. RTP is commonly used in communication and entertainment systems that involve streaming media. Further, RTP is one of the technical foundations of Voice over IP (VoIP) and in this context is often commonly used in conjunction with the Session Initiation Protocol (SIP) to establish connections across an IP network. In operation, an RTP session is established for each multimedia stream (e.g., audio, video) and consists of an IP address with a pair of ports. Also, RTP is used in conjunction with the RTP Control Protocol (RTCP) to provide quality of service (QoS) feedback for each media stream and to synchronize between media streams. As such, while RTP carries the media streams, RTCP is used to monitor transmission statistics and QoS, and to support the synchronization of multiple streams.

RTCP can transport statistics for each multimedia stream and information such as transmitted octet and packet counts, packet loss, packet delay variation, and round-trip delay time. An application may use this information to control QoS parameters such as to limit the data flow or to use a different multimedia coder/decoder (codec). For instance, RTCP can provide explicit information on the recommended data rate for streaming video using an RTCP Temporary Maximum Media Stream Bit Rate Request (TMMBR) message, such as described by Internet Engineering Task Force (IETF) Request for Comments (RFC) 5104 (IETF RFC 5104) (February 2008).

Furthermore, in conventional networks that use Transmission Control Protocol (TCP)/Internet Protocol (IP) (TCP/IP), these networks typically control packet congestion by dropping packets. However, Explicit Congestion Notification (ECN) is an extension to TCP/IP that allows end-to-end notification of network congestion without dropping packets, as described by RFC 3168 (September 2001). Further, ECN is an optional feature that may be used between ECN-enabled endpoints when supported by the underlying network infrastructure. When ECN is successfully negotiated, an ECN-aware sending node may set a mark in the IP header instead of dropping a packet in order to signal impending congestion. The ECN-aware receiving node can echo the congestion indication to the sending node, which then reduces its transmission rate as if it detected a dropped packet. As such, ECN-enabled endpoints can send this indication to implicitly indicate a recommended data rate of a multimedia stream.

However, there are currently no mechanisms to explicitly convey information related to the recommended bit rate from a sending node to a receiving node in the communication system, or for a receiving node to request a recommended bit rate from a sending node in a communication system.

Accordingly, there is a need for improved techniques for recommending a data rate and for requesting a recommended data rate in a communications system. In addition, other desirable features and characteristics of the present disclosure will become apparent from the subsequent detailed description and embodiments, taken in conjunction with the accompanying figures and the foregoing technical field and background.

The Background section of this document is provided to place embodiments of the present disclosure in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the disclosure or to delineate the scope of the disclosure. The sole purpose of this summary is to present some concepts disclosed herein in a simplified form as a prelude to the more detailed description that is presented later.

According to one aspect, a method performed by a wireless device for recommending a data rate on an uplink or downlink communication channel between the wireless device and a network node in a wireless communications system comprises determining to request that the network node recommend a data rate on the uplink or downlink communication channel for the wireless device. Further, the method includes generating a first information element that indicates the request. The first information element is sent via a protocol layer on the uplink communication channel.

According to another aspect, the first information element may be a medium access control (MAC) control element (CE), a packet data convergence protocol (PDCP) control protocol data unit (PDU), or a radio link control (RLC) PDU.

According to another aspect, the first information element may be a radio resource control (RRC) element.

According to another aspect, the second information element may be a MAC CE, a PDCP control PDU, or an RLC PDU.

According to another aspect, the second information element may be an RRC element.

According to one aspect, a wireless device for recommending a data rate on an uplink or downlink communication channel between the wireless device and a network node in a wireless communications system is configured to determine to request that the network node recommend a data rate on the uplink or downlink communication channel for the wireless device. Further, the wireless device is configured to generate a first information element that indicates the request, wherein the first information element is sent via a protocol layer on the uplink communication channel.

According to one aspect, a method performed by a wireless device for recommending a data rate on an uplink or downlink communication channel between the wireless device and a network node in a wireless communications system comprises receiving, from the network node, a second information element that indicates a recommended data rate for the wireless device on the uplink or downlink communication channel. The second information element is received via a protocol layer on the downlink communication channel.

According to one aspect, a wireless device for recommending a data rate on an uplink or downlink communication channel between the wireless device and a network node in a wireless communications system is configured to receive, from the network node, a first information element that indicates a recommended data rate for the wireless device on the uplink or downlink communication channel. The first information element is received via a protocol layer on the downlink communication channel.

According to one aspect, a method performed by a network node for recommending a data rate on an uplink or downlink communication channel between the network node and a wireless device in a wireless communications system comprises determining a recommended data rate for the wireless device on the uplink or downlink communication channel. Further, the method includes generating a second information element that indicates the recommended data rate. The second information element is sent to the wireless device via a protocol layer on the downlink communication channel.

According to one aspect, a network node for recommending a data rate on an uplink or downlink communication channel between the network node and a wireless device in a wireless communications system is configured to determine a recommended data rate for the wireless device on the uplink or downlink communication channel. Further, the network node is configured to generate a second information element that indicates the recommended data rate. The second information element is sent via a protocol layer on the downlink communication channel to the wireless device.

According to one aspect, a method performed by a network node for recommending a data rate on an uplink or downlink communication channel between the network node and a wireless device in a wireless communications system comprises receiving, from the wireless device, a first information element that indicates a request for a recommended data rate by the wireless device on the uplink or downlink communication channel. The first information element is sent via the protocol layer on the uplink communication channel.

According to one aspect, a network node for recommending a data rate on an uplink or downlink communication channel between the network node and a wireless device in a wireless communications system is configured to receive, from the wireless device, a first information element that indicates a request for a recommended data rate by the wireless device on the uplink or downlink communication channel. The first information element is sent via the protocol layer on the uplink communication channel.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

FIG. 6 illustrates another embodiment of a method performed by a wireless device for recommending a data rate in a wireless communications system in accordance with various aspects as described herein.

FIG. 15 provides an example of recommended evaluation assumptions for VoLTE quality related enhancements in accordance with various aspects as described herein.

FIG. 16 provides another example of recommended evaluation assumptions for VoLTE quality related enhancements in accordance with various aspects as described herein.

FIG. 19 illustrates another embodiment of a method performed by a network node for recommending a data rate in a wireless communications system in accordance with various aspects as described herein.

DETAILED DESCRIPTION

For simplicity and illustrative purposes, the present disclosure is described by referring mainly to an exemplary embodiment thereof. In the following description, numerous specific details are set forth in order to provide a thorough understanding of the present disclosure. However, it will be readily apparent to one of ordinary skill in the art that the present disclosure may be practiced without limitation to these specific details. In this description, well known methods and structures have not been described in detail so as not to unnecessarily obscure the present disclosure.

This disclosure describes, among other things, techniques for a network node (e.g., eNB) to send a data rate recommendation to a wireless device (e.g., UE). Further, this disclosure describes techniques for a wireless device to query a network node on a recommended data rate or whether a desired or proposed data rate may be adequately supported by the underlying transport capacity of the uplink or downlink communication channel. Advantages provided by the techniques described herein include reducing the response time and increasing the accuracy of adapting to the recommended data rate on the uplink or downlink communication channel, as well as reducing the amount of call control signaling.

Figure 1:
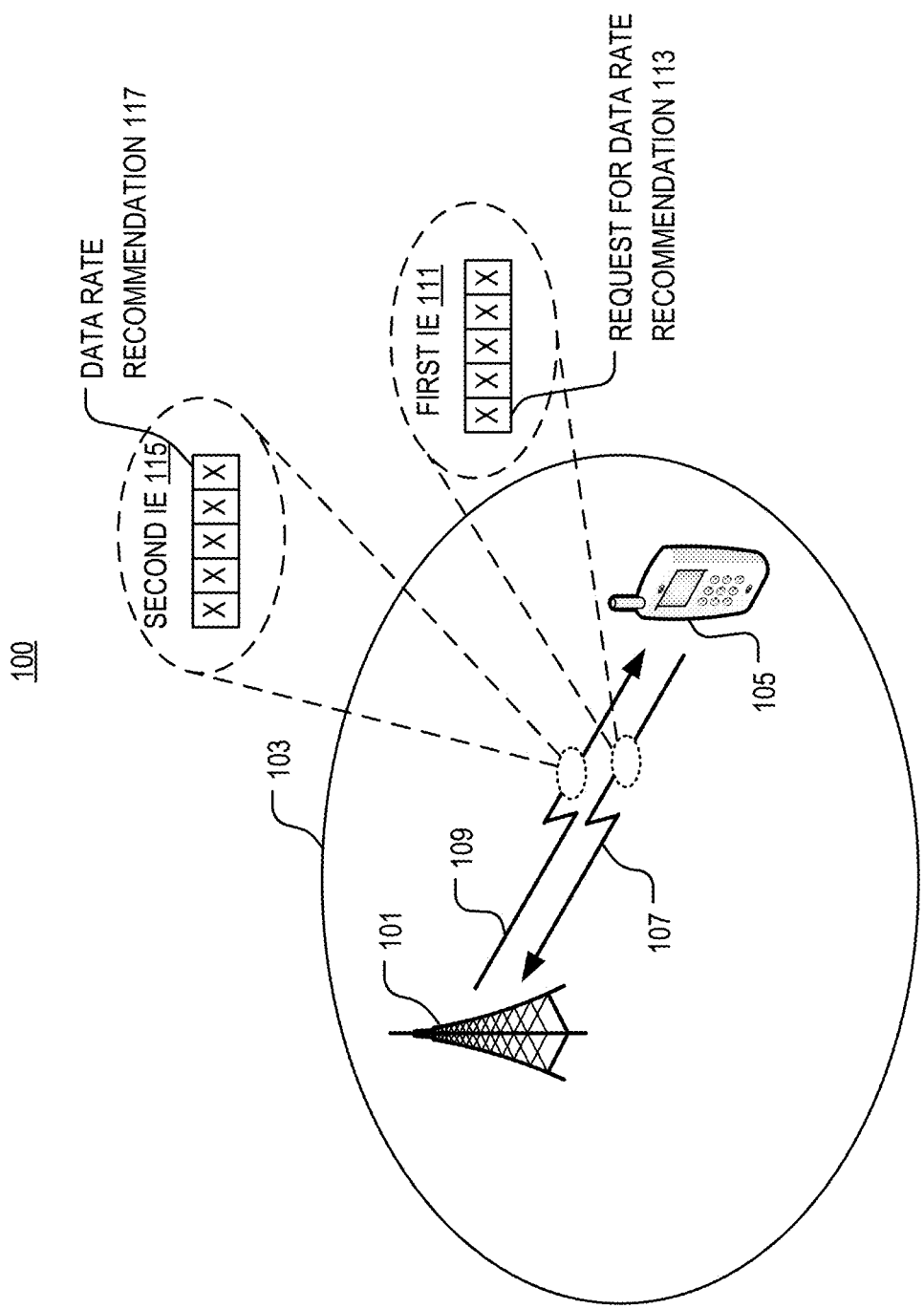
FIG. 1 illustrates one embodiment of a system for recommending a data rate in a wireless communications system in accordance with various aspects as described herein.

Various techniques are described herein for the network node providing the wireless device with a data rate recommendation on the uplink or downlink communication channel and for the wireless device requesting that the network node provide the recommended data rate. For example, FIG. 1 illustrates one embodiment of a system 100 for recommending a data rate in a wireless communications system in accordance with various aspects as described herein. In FIG. 1, a wireless device 105 (e.g., UE) transmits a first information element (IE) 111 to a network node 101 (e.g., base station) via a protocol layer on an uplink communication link 107. The first IE 111 includes a request 113 that the network node 101 recommends a data rate on the uplink or downlink communication channel 107, 109. Further, the request 113 may be associated with one or more applications executed by the wireless device 105. Also, the network node 101 may serve the wireless device 105 in a coverage area 103.

In another embodiment, the wireless device 105 receives a second IE 115 from the network node 101 via the protocol layer on the downlink communication link 109. The second IE 115 includes a data rate recommendation 117 for the wireless device 105 on the uplink or downlink communication channel 107, 109. Based on the data rate recommendation 117, the wireless device 105 may adapt a data rate on the uplink communication channel 107 or may transmit a media adaptation request to another device (e.g., wireless device, network node, media server, or the like) for adapting a data rate on the downlink communication channel 109.

In yet another embodiment, the network node 101 transmits the second IE 115 having the data rate recommendation 117 to the wireless device 105 on the downlink communication channel 109.

In yet another embodiment, the network node 101 receives the first IE 111 having the request 113 from the wireless device 105 on the uplink communication channel 107. In response to the request 113, the network node 101 transmits the second IE 115 having the data rate recommendation 117 to the wireless device 105 on the downlink communication channel 109.

Additionally or alternatively, the protocol layer may represent a user plane layer or any portion thereof such as the medium access control (MAC) layer, the packet data convergence protocol (PDCP) layer, or the radio link control (RLC) layer. For instance, in Long Term Evolution (LTE), the radio protocol architecture between the eNB and the UE can be separated into a control plane and a user plane. The user plane includes the MAC layer, the PDCP layer, and the RLC layer. The control plane includes additionally the radio resource control (RRC) layer, which is responsible for configuring the lower layers.

Figure 12:
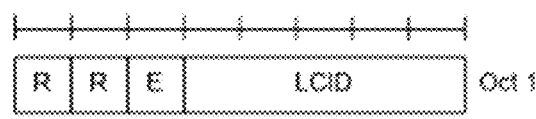
FIG. 12 provides an example of a MAC PDU sub-header for a fixed-sized MAC CE.

On the MAC layer, control information may be sent between two nodes on a communication link using a MAC Control Element (CE). As shown in FIG. 12, a MAC protocol data unit (PDU) sub-header for a fixed-sized MAC control element (CE) may consist of four header fields: Reserved (R), Reserved (R), Extension bit indicating if additional fields are present (E), and Logical Channel ID indicating the identity of the MAC CE (LCID). These four fields are also referred to as R/R/E/LCID. Tables 1 and 2 below show values used for 3rd Generation Partnership Project (3GPP) Long Term Evolution (LTE) DownLink Shared Channel (DL-SCH) and UpLink Shared Channel (UL-SCH).

TABLE 1

MAC Control Elements for DL-SCH

| Index | LCID values | Size |
|---|---|---|
| 01011-11010 | Reserved for future needs | N/A |
| 11011 | Activation/Deactivation | 1 |
| 11100 | UE Contention Resolution Identity | 6 |
| 11101 | Timing Advance Command | 1 |
| 11110 | DRX Command | 0 |

TABLE 2

MAC Control Elements for UL-SCH

| Index | LCID values | Size |
|---|---|---|
| 01011-11000 | Reserved for future needs | N/A |
| 11001 | Extended Power Headroom Report | Variable |
| 11010 | Power Headroom Report | 1 |
| 11011 | C-RNTI | 2 |
| 11100 | Truncated BSR | 1 |
| 11101 | Short BSR | 1 |
| 11110 | Long BSR | 3 |

The MAC CE itself is coded in the payload part of the MAC PDU. Different sizes are used depending on the details of the particular control. In the simplest case, the size is 0 and the function is already fully determined by the sub-header. The size of a MAC CE can also be variable.

For the PDCP, control information may be sent between two nodes (e.g., between a network node and a wireless device) in a communication link using a PDCP control PDU. Currently, PDCP Control PDU is used to convey a PDCP status report indicating which PDCP Service Data Units (SDUs) are missing and which are not following a PDCP re-establishment, and header compression control information (e.g., interspersed RObust Header Compression (ROHC) feedback).

Figure 13:
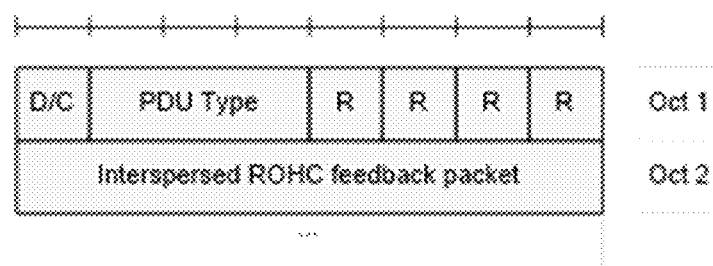
FIG. 13 provides an example of a PDCP control PDU for ROHC feedback.

With reference to the example of the PDCP control PDU for ROHC feedback in FIG. 13, the PDCP control PDU is identified via the Data or Control (D/C) bit set to one and the PDU type bit field. Table 3 below shows values used for 3GPP control PDUs.

TABLE 3

PDCP control PDU types

| Bit | Description |
| --- | --- |
| 000 | PDCP status report |
| 001 | Interspersed ROHC feedback packet |
| 010 | LWA status report |
| 011-111 | Reserved |

Additionally or alternatively, the protocol layer may represent a control plane layer such as a MAC layer, a PDCP layer, an RLC layer or an RRC layer.

Additionally or alternatively, the protocol layer may represent the data link layer (i.e., layer 2 of the seven-layer Open Systems Interconnection (OSI) model) or any portion thereof such as the MAC layer. The data link layer is responsible for transferring data between nodes (e.g., between a network node and a wireless device). The MAC layer is the lower sublayer of the data link layer. As such, the MAC layer provides addressing and channel access control mechanisms that make it possible for wireless devices and network nodes to communicate within an access network that incorporates a shared medium (e.g., a communication link).

Additionally or alternatively, the network node 101 may be configured to support a wireless communication system (e.g., NR, LTE, LTE-NR, 5G, UMTS, GSM, or the like). Further, the network node 101 may be a base station (e.g., eNB), an access point, a wireless router, or the like. The network node 101 may serve wireless devices such as wireless device 105. The wireless device 105 may be configured to support a wireless communication system (e.g., NR, LTE, LTE-NR, 5G, UMTS, GSM, or the like). The wireless device 105 may be a user equipment (UE), a mobile station (MS), a terminal, a cellular phone, a cellular handset, a personal digital assistant (PDA), a smartphone, a wireless phone, an organizer, a handheld computer, a desktop computer, a laptop computer, a tablet computer, a set-top box, a television, an appliance, a game device, a medical device, a display device, a metering device, or the like.

Figure 2:
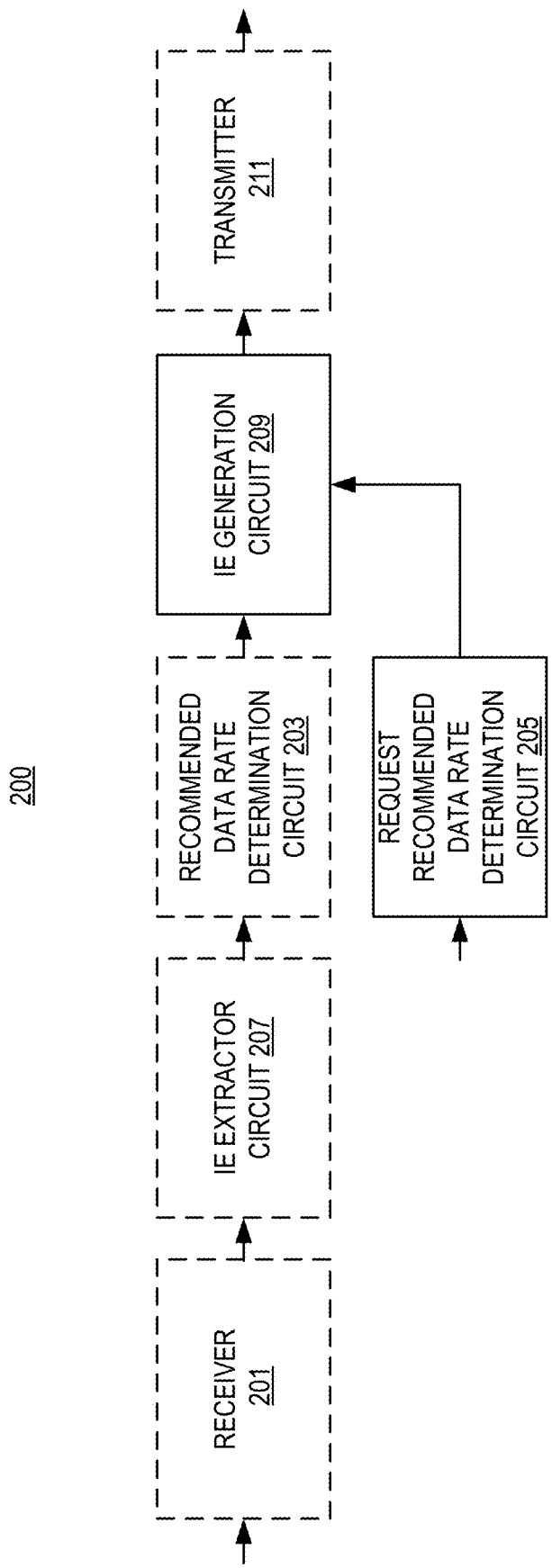
FIG. 2 illustrates one embodiment of a wireless device for recommending a data rate in a wireless communications system in accordance with various aspects as described herein.

FIG. 2 illustrates one embodiment of a wireless device 200 for recommending a data rate in a wireless communications system in accordance with various aspects as described herein. In FIG. 2, the wireless device 200 may include a receiver circuit 201, an information element (IE) extractor circuit 207, a recommended data rate determination circuit 203, a request recommended data rate determination circuit 205, an IE generation circuit, a transmitter circuit 211, the like, or any combination thereof. In one embodiment, the receiver circuit 201 is configured to receive a second information element via a protocol layer on a downlink communication channel from a network node. The information element may include data rate information for the uplink or downlink communication channel. Further, the IE extractor circuit 207 may be configured to obtain the recommended data rate from the second information element. Accordingly, the IE extractor circuit 207 may be configured to extract a second index that indicates the recommended data rate from the second information element. The second index may be an index to a table of data rates (e.g., FIGS. 15-16) on the uplink or downlink communication channel. Further, the IE extractor circuit 207 may be configured to determine the recommended data rate based on the second index.

In another embodiment, the request recommended data rate determination circuit 205 is configured to determine to request that the network node recommend a data rate on the uplink or downlink communication channel for the wireless device. Further, the recommended data rate determination circuit 203 is configured to generate a first information element that indicates the request that the network node recommend a data rate. The first information element is sent via a protocol layer on the uplink communication channel. In addition, the recommended data rate determination circuit 203 may be configured to determine a desired data rate for the wireless device on the uplink or downlink communication channel. The information element extractor circuit 207 may be configured to determine a first index that indicates the desired data rate. The first index may be an index to a table of data rates (e.g., FIGS. 15-16) on the uplink or downlink communication channel. Further, the information element extractor circuit 207 may be configured to insert the first index into the first information element. Finally, the transmitter circuit 211 may be configured to transmit the first information element via the protocol layer on the uplink communication channel.

Figure 3:
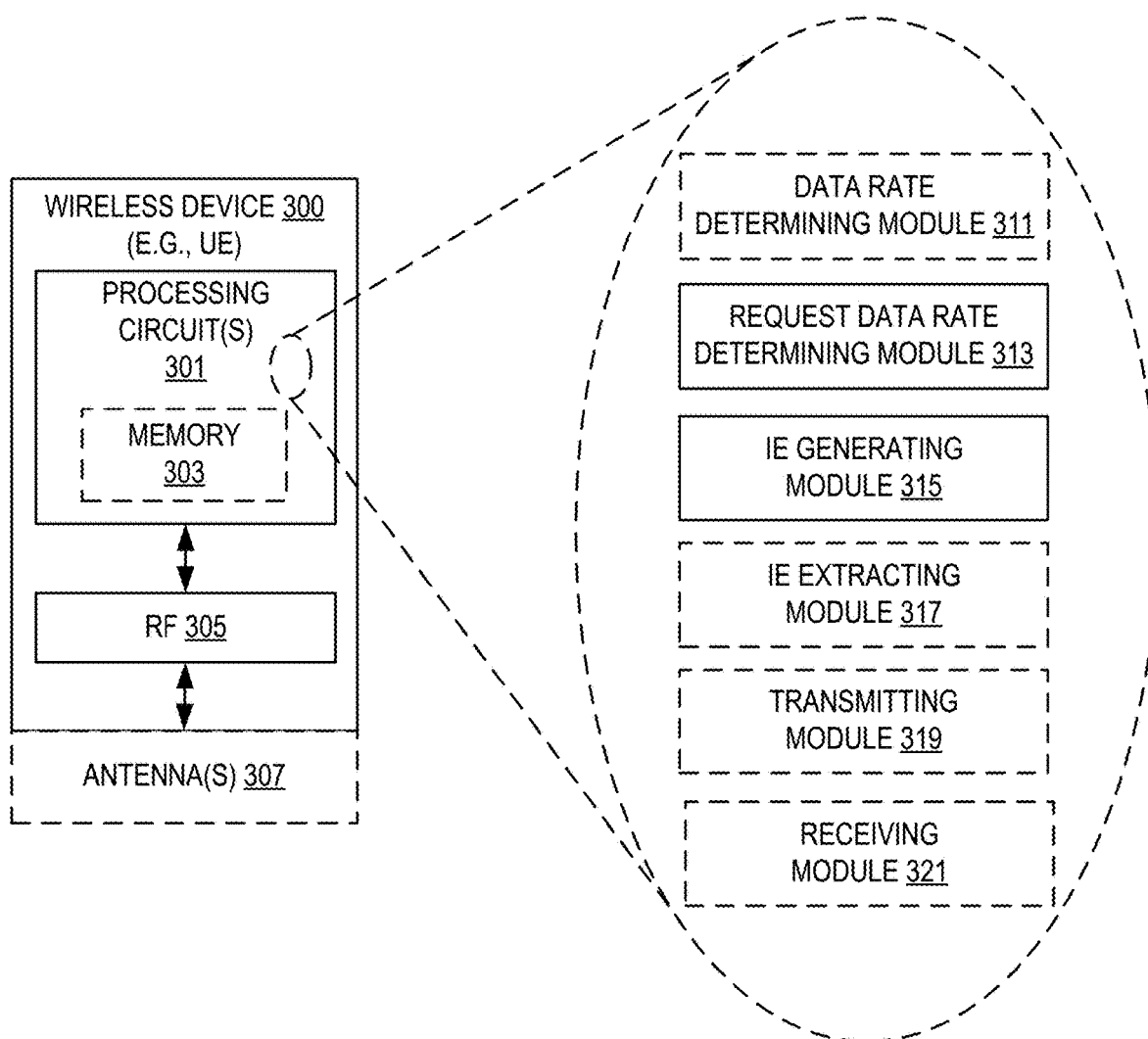
FIG. 3 illustrates another embodiment of a wireless device for recommending a data rate in a wireless communications system in accordance with various aspects as described herein.

FIG. 3 illustrates another embodiment of a wireless device for recommending a data rate in a wireless communications system in accordance with various aspects as described herein. In FIG. 3, the wireless device 300 (e.g., UE) may include processing circuit(s) 301, radio frequency (RF) communications circuit(s) 305, antenna(s) 307, the like, or any combination thereof. The communication circuit(s) 305 may be configured to transmit or receive information to or from one or more network nodes via any communication technology. This communication may occur using the one or more antennas 307 that are either internal or external to the wireless device 300. The processing circuit(s) 301 may be configured to perform processing as described herein (e.g., the method of FIGS. 5, 6, 14, and 17-18) such as by executing program instructions stored in memory 303. The processing circuit(s) 301 in this regard may implement certain functional means, units, or modules.

In FIG. 3, the wireless device 300 may implement various functional means, units, or modules (e.g., via the processing circuit(s) 301 or via software). These functional means, units, or modules (e.g., for implementing the method of FIGS. 5, 6, 14, and 17-18) include a request data rate determining module or unit 313 for determining to request that a network node recommend a data rate on an uplink or downlink communication channel for the wireless device. Further, these functional means, units, or modules include an information element generating module 315 for generating a first information element that indicates the request. The first information element is sent via a protocol layer on the uplink communication channel. Also, these functional means, units, or modules may include a data rate determining module or unit 311 for determining a desired data rate for the wireless device on the uplink or downlink communication channel. The information element generating module or unit 315 may be further configured for determining a first index that indicates the desired data rate, the first index being an index to a table of data rates on the uplink or downlink communication channel, and inserting the first index into the first information element. In addition, these functional means, units, or modules include a transmitter module or unit 319 for transmitting the first information element via the protocol layer on the uplink communication channel.

In FIG. 3, in another embodiment, these functional means, units, or modules include a receiving module or unit 321 for receiving, from a network node, a second information element that indicates a recommended data rate for the wireless device on the uplink or downlink communication channel. The second information element is received via a protocol layer on the downlink communication channel. Further, these functional means, units, or modules may include an information element extracting module or unit 317 for obtaining the recommended data rate from the second information element. Accordingly, the information element extracting module or unit 317 may be configured for extracting a second index that indicates the recommended data rate from the second information element. The second index may be an index to a table of data rates (e.g., FIGS. 15-16) on the uplink or downlink communication channel. In addition, the data rate determining module may be further configured for determining the recommended data rate based on the second index.

Figure 4:
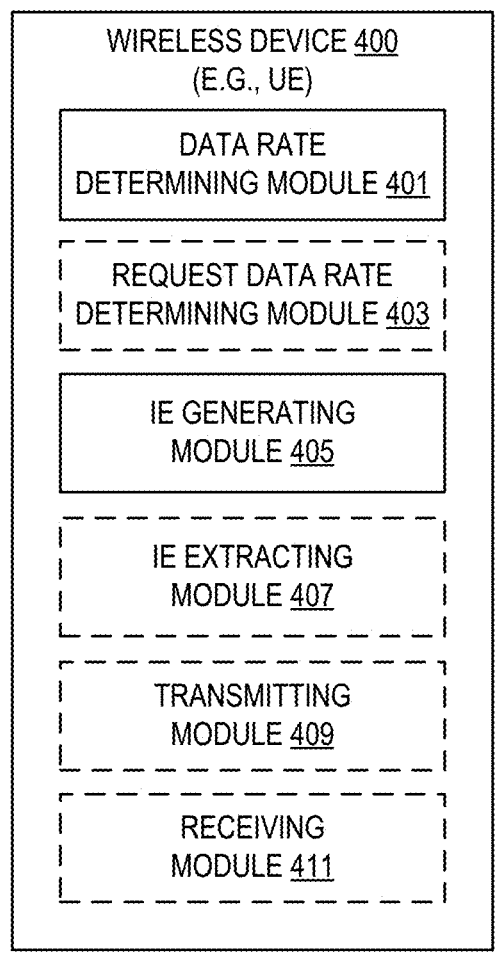
FIG. 4 illustrates another embodiment of a wireless device for recommending a data rate in a wireless communications system in accordance with various aspects as described herein.

FIG. 4 illustrates another embodiment of a wireless device 400 for recommending a data rate in a wireless communications system in accordance with various aspects as described herein. In FIG. 4, the wireless device 400 may implement various functional means, units, or modules (e.g., via the processing circuit(s) 301 of FIG. 3 or via software). These functional means, units, or modules (e.g., for implementing the method of FIGS. 5, 6, 14, and 17-18) include a data rate determining module or unit 401 for determining a desired data rate on the uplink or downlink communication channel based on a recommended data rate for the corresponding communication channel obtained from a second information element received from the network node via a protocol layer on the downlink communication channel. Further, these functional means, units, or modules include an information element generating module or unit 405 for generating an information element that indicates the desired data rate. The first information element having the desired data rate is sent via the protocol layer on the uplink communication channel to the network node. Also, the desired data rate is used by the network node to adjust the recommended data rate for the corresponding communication channel. These functional means, units, or modules may include a transmitting module or unit 409 for transmitting the first information element having the desired data rate to the network node via the protocol layer on the uplink communication channel. In addition, these functional means, units, or modules may include a request data rate determining module or unit for determining to request that the network node recommend a data rate on the uplink or downlink communication channel. Also, these functional means, units, or modules may include a receiving module or unit 411 for receiving, from a network node, a second information element that indicates the recommended data rate for the wireless device on the uplink or downlink communication channel.

Figure 5:
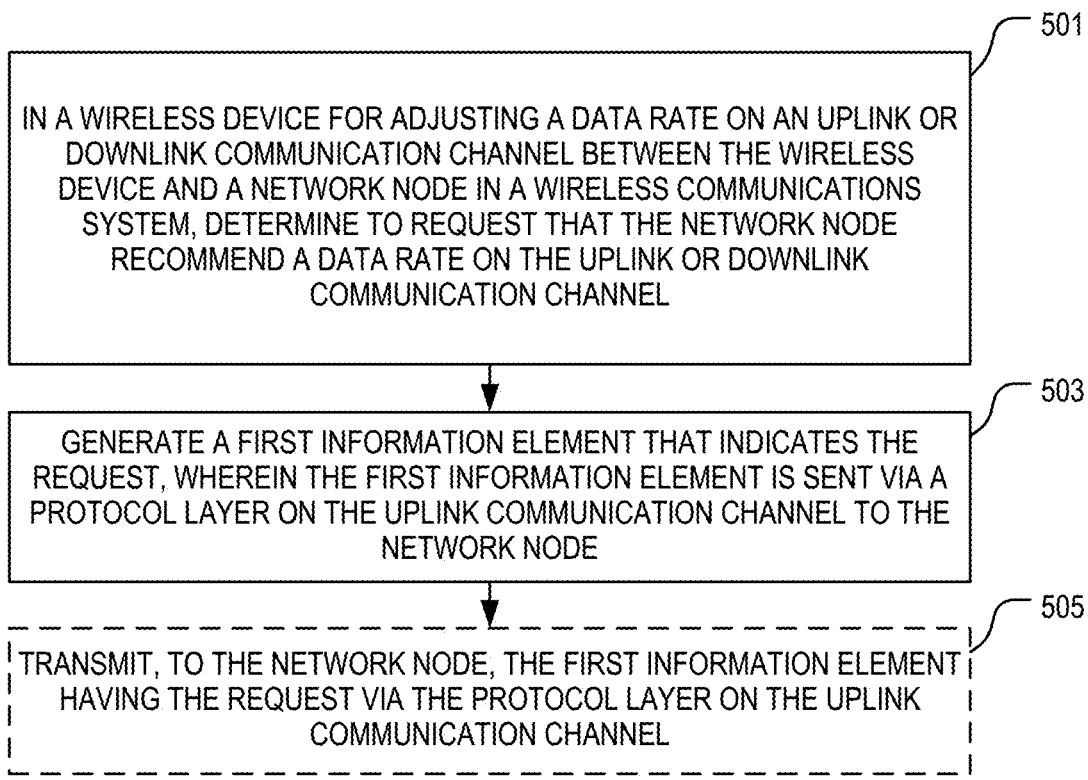
FIG. 5 illustrates one embodiment of a method performed by a wireless device for recommending a data rate in a wireless communications system in accordance with various aspects as described herein.

FIG. 5 illustrates one embodiment of a method 500 performed by a wireless device for recommending a data rate in a wireless communications system in accordance with various aspects as described herein. In FIG. 5, the method 500 includes determining to request that a network node recommend a data rate on an uplink or downlink communication channel. At block 503, the method 500 includes generating a first information element that indicates the request. Further, the first information element may be sent via a protocol layer on the uplink communication channel to the network node. At block 505, the method may include transmitting, to the network node, the first information element having the request via the protocol layer on the uplink communication channel.

FIG. 6 illustrates another embodiment of a method 600 performed by a wireless device for recommending a data rate in a wireless communications system in accordance with various aspects as described herein. In FIG. 6, the method 600 includes determining a desired data rate on an uplink or downlink communication channel based on a recommended data rate for the corresponding communication channel obtained from a second information element received from a network node via a protocol layer on the downlink communication channel. At block 603, the method 600 includes generating a first information element that indicates the desired data rate. Further, the information element is sent to the network node via the protocol layer on the uplink communication channel. Also, the desired data rate is used by the network node to adjust the recommended data rate for the corresponding communication channel. At block 605, the method 600 may include transmitting the first information element having the desired data rate to the network node via the protocol layer on the uplink communication channel.

Figure 7:
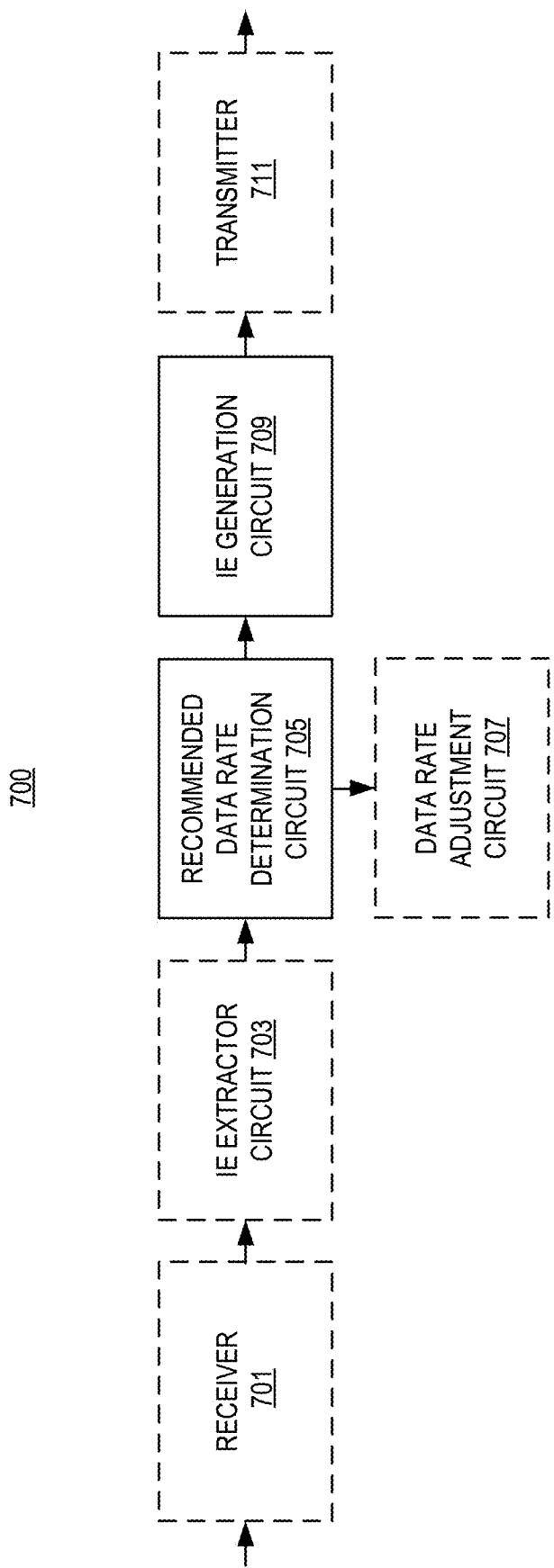
FIG. 7 illustrates one embodiment of a network node for recommending a data rate in a wireless communications system in accordance with various aspects as described herein.

FIG. 7 illustrates one embodiment of a network node 700 for recommending a data rate in a wireless communications system in accordance with various aspects as described herein. In FIG. 7, the network node 700 may be configured to include a receiver circuit 701, an information element extractor circuit 703, a recommended data rate determination circuit 705, a data rate adjustment circuit 707, an information element generation circuit 709, a transmitter circuit 711, the like, or any combination thereof. The receiver circuit 701 may be configured to receive, from a wireless device, a first information element that indicates a request for a recommended data rate by the wireless device on an uplink or downlink communication channel. Further, the first information element may be sent via the protocol layer on the uplink communication channel. The information element extractor circuit 703 may be configured to extract the request from the first information element. Further, the recommended data rate determination circuit 705 is configured to determine a recommended data rate for the wireless device on the uplink or downlink communication channel. The data rate adjustment circuit 707 may be configured to adjust the recommended data rate based on a desired data rate that is received in a first information element from the wireless device.

Figure 8:
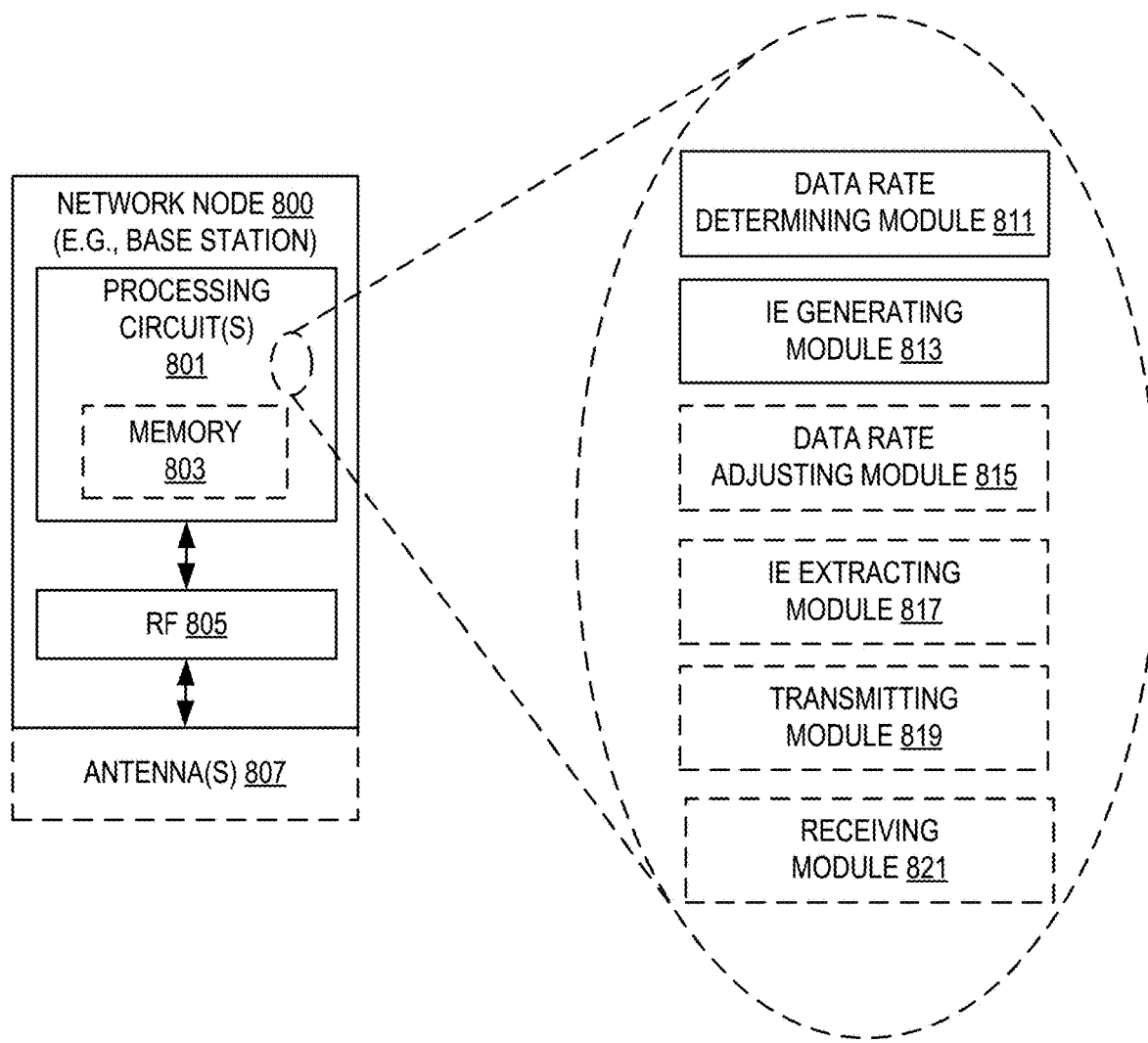
FIG. 8 illustrates another embodiment of a network node for recommending a data rate in a wireless communications system in accordance with various aspects as described herein.

FIG. 8 illustrates another embodiment of a network node 800 for recommending a data rate in a wireless communications system in accordance with various aspects as described herein. In FIG. 8, the wireless device 800 (e.g., UE) may include processing circuit(s) 801, radio frequency (RF) communications circuit(s) 805, antenna(s) 807, the like, or any combination thereof. The communication circuit(s) 805 may be configured to transmit or receive information to or from one or more network nodes or one or more wireless devices via any communication technology. This communication may occur using the one or more antennas 807 that are either internal or external to the wireless device 800. The processing circuit(s) 801 may be configured to perform processing as described herein (e.g., the method of FIGS. 10, 14, and 19) such as by executing program instructions stored in memory 803. The processing circuit(s) 801 in this regard may implement certain functional means, units, or modules.

In FIG. 8, the network node 800 may implement various functional means, units, or modules (e.g., via the processing circuit(s) 801 or via software). These functional means, units, or modules (e.g., for implementing the method of FIGS. 10, 14, and 19) include a data rate determining module or unit 811 for determining a recommended data rate for a wireless device on an uplink or downlink communication channel. Further, these functional means, units, or modules include an information element generating module or unit 813 for generating a second information element that indicates the recommended data rate. The second information element having the recommended data rate is sent to the wireless device via a protocol layer on the downlink communication channel. Also, these functional means, units, or modules may include a transmitting module or unit 819 for transmitting, to the wireless device, the information element having the recommended data rate via the protocol layer on the downlink communication channel.

Figure 9:
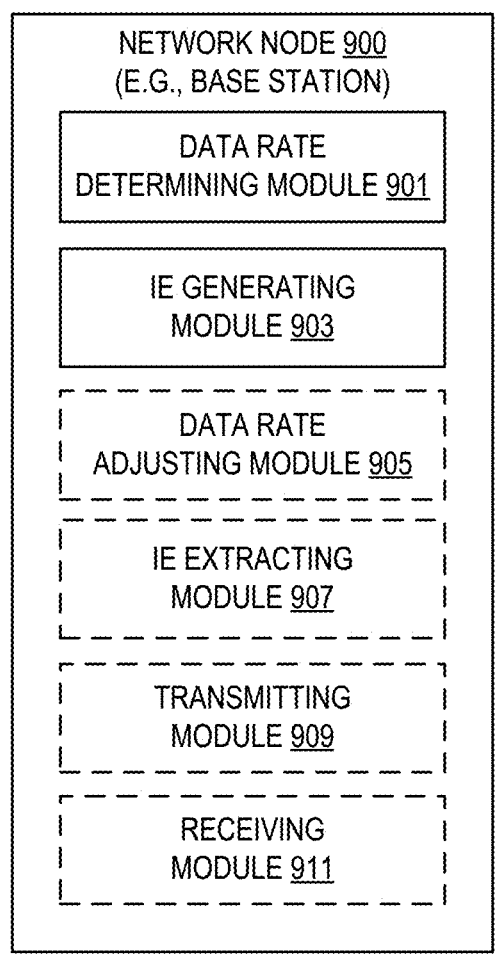
FIG. 9 illustrates another embodiment of a network node for recommending a data rate in a wireless communications system in accordance with various aspects as described herein.

In another embodiment, these functional means, units, or modules may include a receiving module or unit 821 for receiving, from the wireless device, a first information element that indicates a request for the recommended data rate by the wireless device on the uplink or downlink communication channel. The first information element may be sent via the protocol layer on the uplink communication channel. In addition, these functional means, units, or modules may include an information element extracting module or unit 817 for extracting the request from the first information element. Finally, these functional means, units, or modules may include a data rate adjusting module or unit 815 for adjusting the recommended data rate based on a desired data rate that is received in the first information element from the wireless device. FIG. 9 illustrates another embodiment of a network node for recommending a data rate in a wireless communications system in accordance with various aspects as described herein. In another embodiment, these functional means, units, or modules includes a receiving module or unit 911 for receiving, from a wireless device, a first information element that indicates a request for a recommended data rate by the wireless device on an uplink or downlink communication channel. The first information element is sent via the protocol layer on the uplink communication channel. Further, these functional means, units, or modules may include an information element extracting module or unit 907 for obtaining the request for the recommended data rate from the first information element. Accordingly, the information element extracting module or unit 907 may be configured for extracting a first index from the first information element and for determining the desired data rate from the first index. Further, the first index may indicate a desired data rate for the wireless device on the uplink or downlink communication channel. Also, the first index may be an index to a table of data rates (e.g., FIGS. 15-16) on the uplink or downlink communication channel. These functional means, units, or modules may include a data rate determining module or unit 901 for determining the recommended data rate, which may be based on the desired data rate. Further, these functional means, units, or modules includes may include a data rate adjusting module or unit 905 for determining the recommended data rate based on the desired data rate. These functional means, units, or modules may include an information element generating module or unit 903 for generating a second information element that indicates the recommended data rate. The second information element having the recommended data rate may be sent to the wireless device via a protocol layer on the downlink communication channel. These functional means, units, or modules may include a transmitting module or unit 909 for transmitting, to the wireless device, the second information element having the recommended data rate via the protocol layer on the downlink communication channel.

Figure 10:
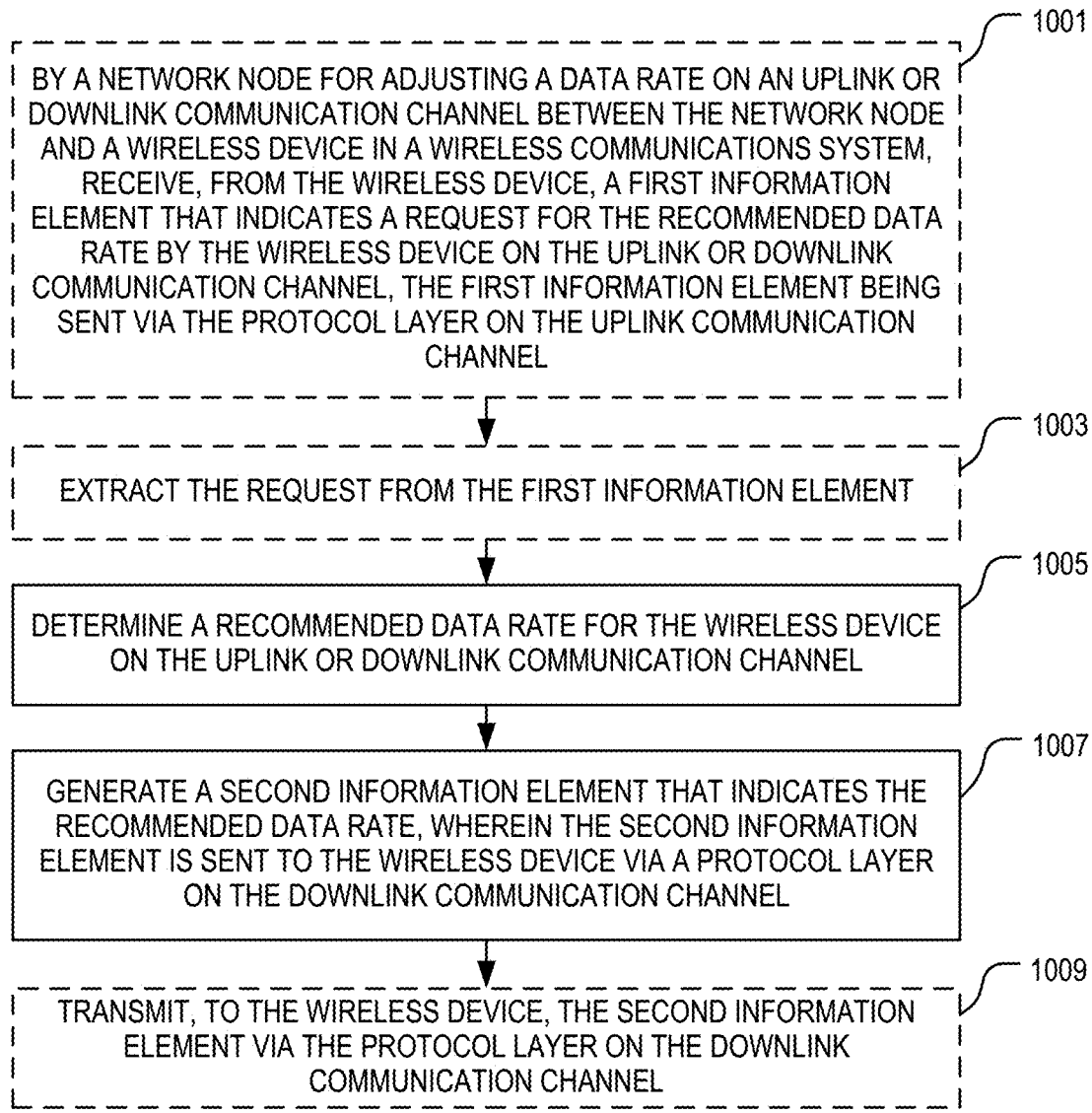
FIG. 10 illustrates one embodiment of a method performed by a network node for recommending a data rate in a wireless communications system in accordance with various aspects as described herein.

FIG. 10 illustrates one embodiment of a method 1000 performed by a network node for adapting a MIMO receiver to perform a MIMO receiver test in accordance with various aspects as described herein. In FIG. 10, the method 1000 may include receiving, from the wireless device, a first information element that indicates a request for the recommended data rate by the wireless device on the uplink or downlink communication channel. Further, the first information element may be sent via the protocol layer on the uplink communication channel. At block 1003, the method 1000 may include extracting the request from the first information element. At block 1005, the method 1000 includes determining a recommended data rate for the wireless device on the uplink or downlink communication channel. At block 1007, the method 1000 includes generating a second information element that indicates the recommended data rate. Further, the second information element having the recommended data rate is sent to the wireless device via a protocol layer on the downlink communication channel. At block 1009, the method may include transmitting, to the wireless device, the second information element having the recommended data rate via the protocol layer on the downlink communication channel.

Figure 11:
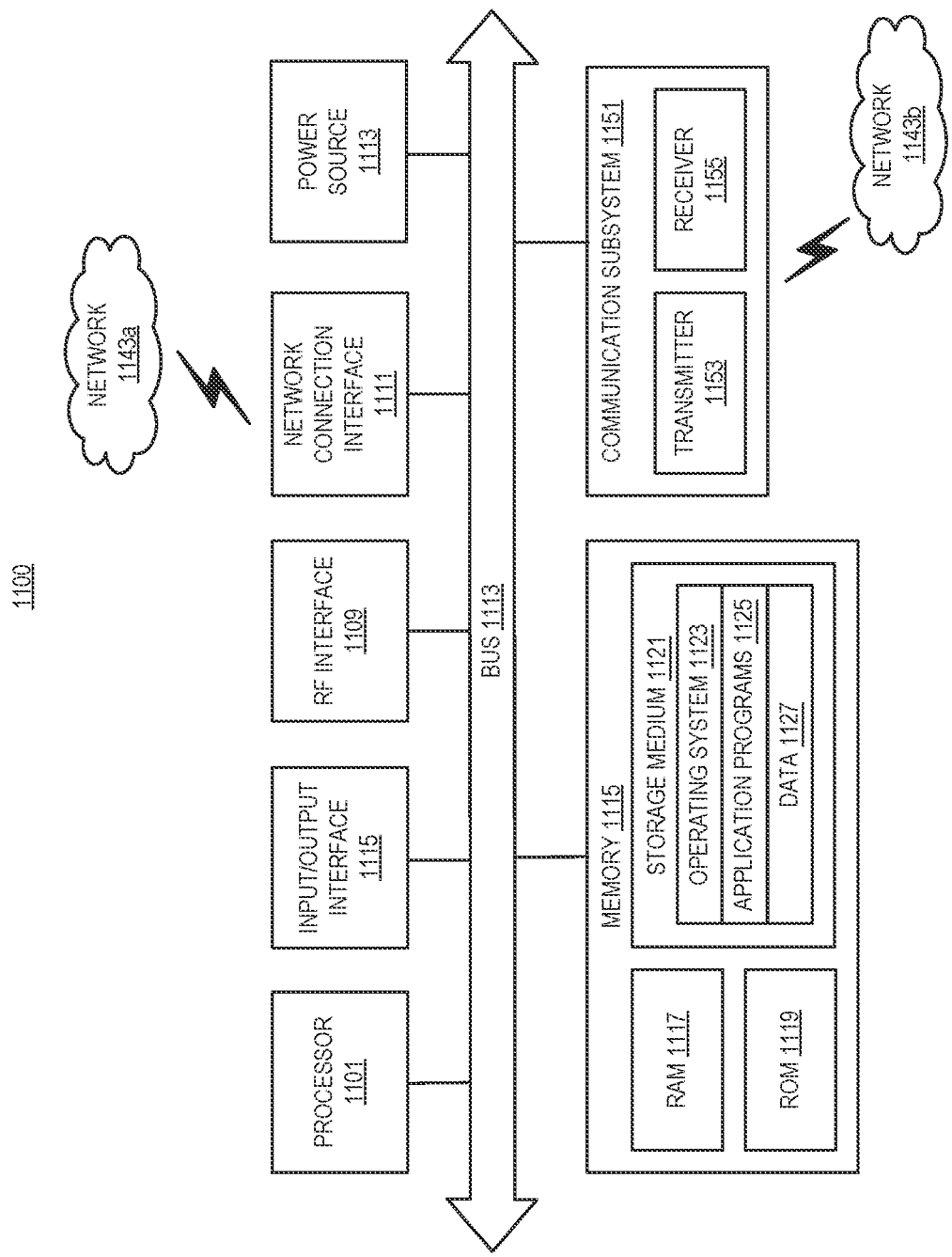
FIG. 11 illustrates another embodiment of a wireless device in accordance with various aspects as described herein.

FIG. 11 illustrates another embodiment of a wireless device 1100 in accordance with various aspects as described herein. In some instances, the wireless device 1100 may be referred as a network node, a base station (BS), an access point (AP), a user equipment (UE), a mobile station (MS), a terminal, a cellular phone, a cellular handset, a personal digital assistant (PDA), a smartphone, a wireless phone, an organizer, a handheld computer, a desktop computer, a laptop computer, a tablet computer, a set-top box, a television, an appliance, a game device, a medical device, a display device, a metering device, or some other like terminology. In other instances, the wireless device 1100 may be a set of hardware components. In FIG. 11, the wireless device 1100 may be configured to include a processor 1101 that is operatively coupled to an input/output interface 1105, a radio frequency (RF) interface 1109, a network connection interface 1111, a memory 1115 including a random access memory (RAM) 1117, a read only memory (ROM) 1119, a storage medium 1121 or the like, a communication subsystem 1151, a power source 1113, another component, or any combination thereof. The storage medium 1121 may include an operating system 1123, an application program 1125, data 1127, or the like. Specific devices may utilize all of the components shown in FIG. 11, or only a subset of the components, and levels of integration may vary from device to device. Further, specific devices may contain multiple instances of a component, such as multiple processors, memories, transceivers, transmitters, receivers, etc. For instance, a computing device may be configured to include a processor and a memory.

In FIG. 11, the processor 1101 may be configured to process computer instructions and data. The processor 1101 may be configured as any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above. For example, the processor 1101 may include two computer processors. In one definition, data is information in a form suitable for use by a computer. It is important to note that a person having ordinary skill in the art will recognize that the subject matter of this disclosure may be implemented using various operating systems or combinations of operating systems.

In the current embodiment, the input/output interface 1105 may be configured to provide a communication interface to an input device, output device, or input and output device. The wireless device 1100 may be configured to use an output device via the input/output interface 1105. A person of ordinary skill will recognize that an output device may use the same type of interface port as an input device. For example, a USB port may be used to provide input to and output from the wireless device 1100. The output device may be a speaker, a sound card, a video card, a display, a monitor, a printer, an actuator, an emitter, a smartcard, another output device, or any combination thereof. The wireless device 1100 may be configured to use an input device via the input/output interface 1105 to allow a user to capture information into the wireless device 1100. The input device may include a mouse, a trackball, a directional pad, a trackpad, a presence-sensitive input device, a display such as a presence-sensitive display, a scroll wheel, a digital camera, a digital video camera, a web camera, a microphone, a sensor, a smartcard, and the like. The presence-sensitive input device may include a digital camera, a digital video camera, a web camera, a microphone, a sensor, or the like to sense input from a user. The presence-sensitive input device may be combined with the display to form a presence-sensitive display. Further, the presence-sensitive input device may be coupled to the processor. The sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, the RF interface 1109 may be configured to provide a communication interface to RF components such as a transmitter, a receiver, and an antenna. The network connection interface 1111 may be configured to provide a communication interface to a network 1143*a*. The network 1143*a* may encompass wired and wireless communication networks such as a local-area network (LAN), a wide-area network (WAN), a computer network, a wireless network, a telecommunications network, another like network or any combination thereof. For example, the network 1143*a* may be a Wi-Fi network. The network connection interface 1111 may be configured to include a receiver and a transmitter interface used to communicate with one or more other nodes over a communication network according to one or more communication protocols known in the art or that may be developed, such as Ethernet, TCP/IP, SONET, ATM, or the like. The network connection interface 1111 may implement receiver and transmitter functionality appropriate to the communication network links (e.g., optical, electrical, and the like). The transmitter and receiver functions may share circuit components, software or firmware, or alternatively may be implemented separately.

In this embodiment, the RAM 1117 may be configured to interface via the bus 1102 to the processor 1101 to provide storage or caching of data or computer instructions during the execution of software programs such as the operating system, application programs, and device drivers. In one example, the wireless device 1100 may include at least one hundred and twenty-eight megabytes (128 Mbytes) of RAM. The ROM 1119 may be configured to provide computer instructions or data to the processor 1101. For example, the ROM 1119 may be configured to be invariant low-level system code or data for basic system functions such as basic input and output (I/O), startup, or reception of keystrokes from a keyboard that are stored in a non-volatile memory. The storage medium 1121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives. In one example, the storage medium 1121 may be configured to include an operating system 1123, an application program 1125 such as a web browser application, a widget or gadget engine or another application, and a data file 1127.

In FIG. 11, the processor 1101 may be configured to communicate with a network 1143*b* using the communication subsystem 1151. The network 1143*a* and the network 1143*b* may be the same network or networks or different network or networks. The communication subsystem 1151 may be configured to include one or more transceivers used to communicate with the network 1143*b*. The one or more transceivers may be used to communicate with one or more remote transceivers of another wireless device such as a base station of a radio access network (RAN) according to one or more communication protocols known in the art or that may be developed, such as IEEE 802.xx, CDMA, WCDMA, GSM, LTE, UTRAN, WiMax, or the like.

In another example, the communication subsystem 1151 may be configured to include one or more transceivers used to communicate with one or more remote transceivers of another wireless device such as user equipment according to one or more communication protocols known in the art or that may be developed, such as IEEE 802.xx, CDMA, WCDMA, GSM, LTE, UTRAN, WiMax, or the like. Each transceiver may include a transmitter 1153 or a receiver 1155 to implement transmitter or receiver functionality, respectively, appropriate to the RAN links (e.g., frequency allocations and the like). Further, the transmitter 1153 and the receiver 1155 of each transceiver may share circuit components, software or firmware, or alternatively may be implemented separately.

In the current embodiment, the communication functions of the communication subsystem 1151 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 1151 may include cellular communication, Wi-Fi communication, Bluetooth communication, and GPS communication. The network 1143*b* may encompass wired and wireless communication networks such as a local-area network (LAN), a wide-area network (WAN), a computer network, a wireless network, a telecommunications network, another like network or any combination thereof. For example, the network 1143*b* may be a cellular network, a Wi-Fi network, and a near-field network. The power source 1113 may be configured to provide an alternating current (AC) or direct current (DC) power to components of the wireless device 1100.

In FIG. 11, the storage medium 1121 may be configured to include a number of physical drive units, such as a redundant array of independent disks (RAID), a floppy disk drive, a flash memory, a USB flash drive, an external hard disk drive, thumb drive, pen drive, key drive, a high-density digital versatile disc (HD-DVD) optical disc drive, an internal hard disk drive, a Blu-Ray optical disc drive, a holographic digital data storage (HDDS) optical disc drive, an external mini-dual in-line memory module (DIMM) synchronous dynamic random access memory (SDRAM), an external micro-DIMM SDRAM, a smartcard memory such as a subscriber identity module or a removable user identity (SIM/RUIM) module, other memory, or any combination thereof. The storage medium 1121 may allow the wireless device 1100 to access computer-executable instructions, application programs or the like, stored on transitory or non-transitory memory media, to off-load data, or to upload data. An article of manufacture, such as one utilizing a communication system may be tangibly embodied in storage medium 1121, which may comprise a computer-readable medium.

The functionality of the methods described herein may be implemented in one of the components of the wireless device 1100 or partitioned across multiple components of the wireless device 1100. Further, the functionality of the methods described herein may be implemented in any combination of hardware, software or firmware. In one example, the communication subsystem 1151 may be configured to include any of the components described herein. Further, the processor 1101 may be configured to communicate with any of such components over the bus 1102. In another example, any of such components may be represented by program instructions stored in memory that when executed by the processor 1101 performs the corresponding functions described herein. In another example, the functionality of any of such components may be partitioned between the processor 1101 and the communication subsystem 1151. In another example, the non-computative-intensive functions of any of such components may be implemented in software or firmware and the computative-intensive functions may be implemented in hardware.

This disclosure introduces a mechanism for the network node (eNB) to send rate recommendation to the terminal (UE) and also a mechanism for the UE to query the eNB on a recommended bit rate, or query if a proposed bit rate may be adequately supported by the underlying transport capacity. Further, embodiments described herein may reduce the response time and increase the accuracy of adapting to the optimal bit rate on the transmission link of the rate adaptation of a client compared to solutions in the core network (CN) (e.g., Explicit Congestion Notification (ECN) or application layers such as rate adaptation commands). Embodiments described herein may also limit the amount of call control signaling, reducing the risk of control signaling interfering with the media traffic.

Figure 14:
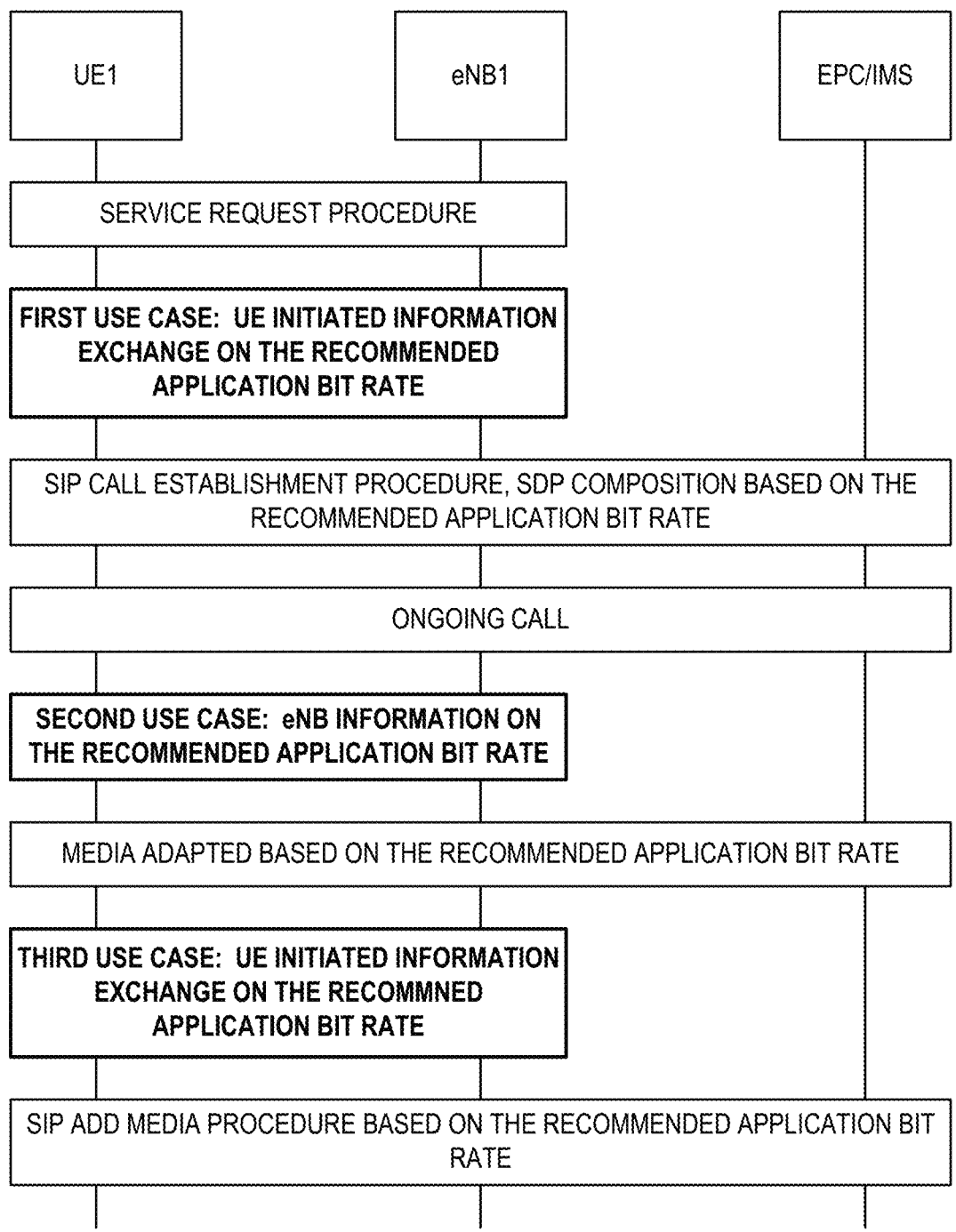
FIG. 14 describes use cases for rate adaptation in accordance with various aspects as described herein.

In FIG. 14, three exemplary use cases for the eNB providing the UE with information on the recommended application bit rate are described. FIG. 14 is presented as a half call and it is described that the information on the recommended application bit rate is exchanged by the UE and the eNB for the local link. The end-to-end usage of this information is proposed to be handled via the regular call-control signaling (e.g., Session Initiation Protocol (SIP) and Session Description Protocol (SDP)) or rate adaptation commands (Codec Mode Request (CMR) for voice and Real-time Transport Control Protocol (RTCP) Temporary Maximum Media Stream Bitrate Request (TMMBR) for video).

The embodiments described herein may be applicable to both the mobile originating and mobile terminating side. In the following cases, the legacy SIP/SDP/Real-time Transport Protocol (RTP) signaling procedures may be followed. Further, the information exchange may be optimized based on the Radio Access Network (RAN) assistance, leading to an improved end-user service.

In the first use case of FIG. 14, after the initial Radio Resource Control (RRC) connection establishment procedure, the information obtained from a UE initiated information exchange on the recommended application bit rate may be used by the UE to tailor its outgoing SDP offer/answer. With this, the amount of SIP signaling may be reduced in case the radio link may not support the requested transport capacity.

In the second use case of FIG. 14, once the call has been established, the eNB may send information on the recommended application bit rate in order for the UE to either directly adapt its media rate on the up-link or initiate a rate adaptation command (e.g., CMR and RTCP TMMBR) to its peer for adapting the down-link rate.

In the third use case of FIG. 14, during an on-going call, the UE may initiate an information exchange on the recommended application bit rate for optimizing the SIP signaling such as an end-user request to add video to the call. If the recommended application bit rate is not sufficient to support a video stream, the SIP add media procedure may not be initiated rather than being terminated on that the eNB rejects the establishment of a video bearer. Similar to the information exchange at call setup, this will reduce the SIP signaling and may, particularly in poor radio conditions, reduce the risk of the SIP signaling negatively affecting the speech quality or other service performance indicators.

For the rate recommendation from the eNB to the UE, fields indicating the logical channel identity (e.g., 4 bits), the uplink or downlink direction (e.g., 1 bit), and an index to a table of transport bandwidths (e.g, 7-11 bits) may be used. These exemplary bit field lengths may result in a total of twelve to sixteen bits (12-16 bits) but any length of the bit fields may be considered. The rate recommendation may also be given an explicit number, and not as an index to a table. The bit field for the link may also be extended to cover the case where the rate information is applicable for both the uplink and the downlink directions. This may remove the need for sending the information element explicitly for each uplink or downlink link.

In one embodiment, the information contained in a MAC CE transmitted from the eNB to the UE may be described by Table 4. This information may also include a table with, for instance, one hundred and twenty-eight (128) elements including four reserved bits for possible extensions (e.g., extending the table).

TABLE 4

Example of MAC CE for eNB to UE bit rate information.

| 0 | 1 | 2 | 3 | 4 | 5 | 6 | 7 |
|---|---|---|---|---|---|---|---|
| Logical Channel Identity | | | | UL/DL | | Table Index | |
| Table index continued | | | | R | R | R | R |

If the information is sent via a PDCP control PDU, the logical channel identity field may not be needed since the PDCP layer is unique to a logical channel. The corresponding bits from Table 4 may thus be reserved, or the information may be formatted as in Table 5 below with no reserved bits.

TABLE 5

Example of PDCP control PDU for eNB to UE bit rate information.

| 0 | 1 | 2 | 3 | 4 | 5 | 6 | 7 |
|---|---|---|---|---|---|---|---|
| UL/DL | | | | Table index | | | |

For the UE to initiate an information exchange on the currently recommended application bit rate, an element consisting of fields indicating the desired packet treatment (e.g., 8 bits) such as latency and averaging used for computing the bit rate, the uplink or downlink direction (e.g., 1 bit), and an index to a table with tabulated values of the desired application bit rate (e.g., 7 bits). Also, the bit rate may also be an explicit number instead of an index to a table.

If the information is sent via a MAC CE, the logical channel identity may be included in order to link the information request to a specific service (e.g., Voice over LTE (VoLTE) service such as described by GSMA PRD IR.92), which uses a dedicated radio bearer for the IP Multimedia Subsystem Access Point Name (IMS APN), which is separate from the mobile broadband APN. The VoLTE media and video if GSMA PRD IR.94 services are used may then transmit on dedicated bearers on the same IMS APN.

An example of a MAC CE for the query from the UE to the eNB is given by Table 6 below.

TABLE 6

Example of MAC CE for UE query to eNB on the recommended bit rate.

| 0 | 1 | 2 | 3 | 4 | 5 | 6 | 7 |
|---|---|---|---|---|---|---|---|
| | | | Desired packet treatment | | | | |
| Logical Channel Identity | | | | UL/DL | | Table index | |
| Table index continued | | | | R | R | R | R |

An example of a PDCP control PDU for the query from the UE to the eNB is given by Table 7.

TABLE 7

Example of a PDCP control PDU for UE query to eNB on the recommended bit rate.

| 0 | 1 | 2 | 3 | 4 | 5 | 6 | 7 |
|---|---|---|---|---|---|---|---|
| | | | Desired packet treatment | | | | |
| UL/DL | | | | Table index | | | |

In another embodiment, the UE may send a query that contains only the following: logical channel identity (no need in case it is a PDCP control PDU), UL/DL and a flag indicating the query.

TABLE 8

Example of MAC CE for UE query to eNB using query indication.

| 0 | 1 | 2 | 3 | 4 | 5 | 6 | 7 |
|---|---|---|---|---|---|---|---|
| | | | Desired packet treatment | | | | |
| Logical Channel Identity | | | | UL/DL | | Query indication | R | R |

In another embodiment, a PDCP control PDU for the query from the UE to the eNB using query indication is given by Table 9 below.

TABLE 9

Example of a PDCP control PDU for UE query to eNB using query indication.

| 0 | 1 | 2 | 3 | 4 | 5 | 6 | 7 |
|---|---|---|---|---|---|---|---|
| | | | Desired packet treatment | | | | |
| UL/DL | Query indication | R | R | R | | R | R |

The response from the eNB to the UE can use the same format as for the rate recommendation from eNB to the UE as described above, with the reserved value '0000' for the field of the logical channel identity if using a MAC CE. Again, if the information is sent via a PDCP control PDU, then the field for the logical channel identity may be omitted. Possibly the eNB may respond with a bit rate either equivalent to, less than, or greater than the bit rate included in the query from the UE. Also, the eNB may send a response with reject for the query for a recommended bit rate.

If tabulated values of the bit rate are used, the bit rates may be logarithmically spaced including the Adaptive Multi-Rate (AMR), AMR WideBand (AMRWB), or Enhanced Voice Service (EVS) codec bit rates at the low end of the scale. It is further proposed to reserve index '0' for 0 kbps and the index '1' for indicating 'release of previous bit rate recommendation'. An index may also be included to indicate 'no bit rate recommendation is available', this may also be used for rejecting a query from a UE on a recommended bit rate. An example of a table with bit rates and other information is given by FIG. 15. In FIG. 15, the first index (i.e., I=1) is used for indicating that the previous bit rate recommendation is no longer valid and no new bit rate recommendation is given. Further, the second index (i.e., I=2) is used to indicate that no bit rate recommendation is available or that the query from the UE on a recommended bit rate was rejected.

In another embodiment, a wireless device (e.g., UE) may send a query to a network node using an Information Element (IE) on either the MAC or PDCP layer on the recommended bit rate to use for its application In another embodiment, a wireless device may adapt its sending media bit or sends an outgoing media adaptation request to its peer for reducing its sending rate based on the rate information obtained on an IE on the MAC or PDCP layer In another embodiment, a network node may send an IE containing bit rate recommendation to a terminal on either the MAC or PDCP layer In another embodiment, a network node may respond to a query from a terminal on the recommended bit rate used for either the uplink or downlink to the terminal.

In another embodiment, enhancements that improve the VoLTE or video quality are provided. Enhanced Voice Services (EVS) 7.2 kbps coder/decoder (codec) may be used as the baseline speech codec for evaluation, including evaluating the effects of handling up to four speech frames in one transmission. Global System for Mobile communications (GSM) Association (GSMA) Permanent Reference Document (PRD) IR.92 specifies that the UE and the entities in the Internet Protocol (IP) Multimedia System (IMS) core network that terminate the user plane must request to receive one speech frame encapsulated in each RTP packet. However, in order to evaluate possible coverage enhancement benefits, one option is to consider that RAN aggregates up to four RTP packets with one speech frame encapsulated in one RTP packet and that the application encapsulates up to four packets in one RTP packet. Further, full ROHC header compression may be assumed with Buffer Status Report (BSR) and Power Headroom Report (PHR) in each transmission. The resulting required transport block size, including PDCP, Radio Link Control (RLC), and MAC headers for the different packet bundling strategies, is presented in FIG. 16. FIG. 16 illustrates sending LS to RAN1 with recommended evaluation assumptions for VoLTE quality-related enhancements. In FIG. 16, RAN aggregation of RTP packets are each composed of one speech frame. Further, application encapsulation of speech frames in one RTP packet requires updates to the VoLTE service description.

Figure 17:
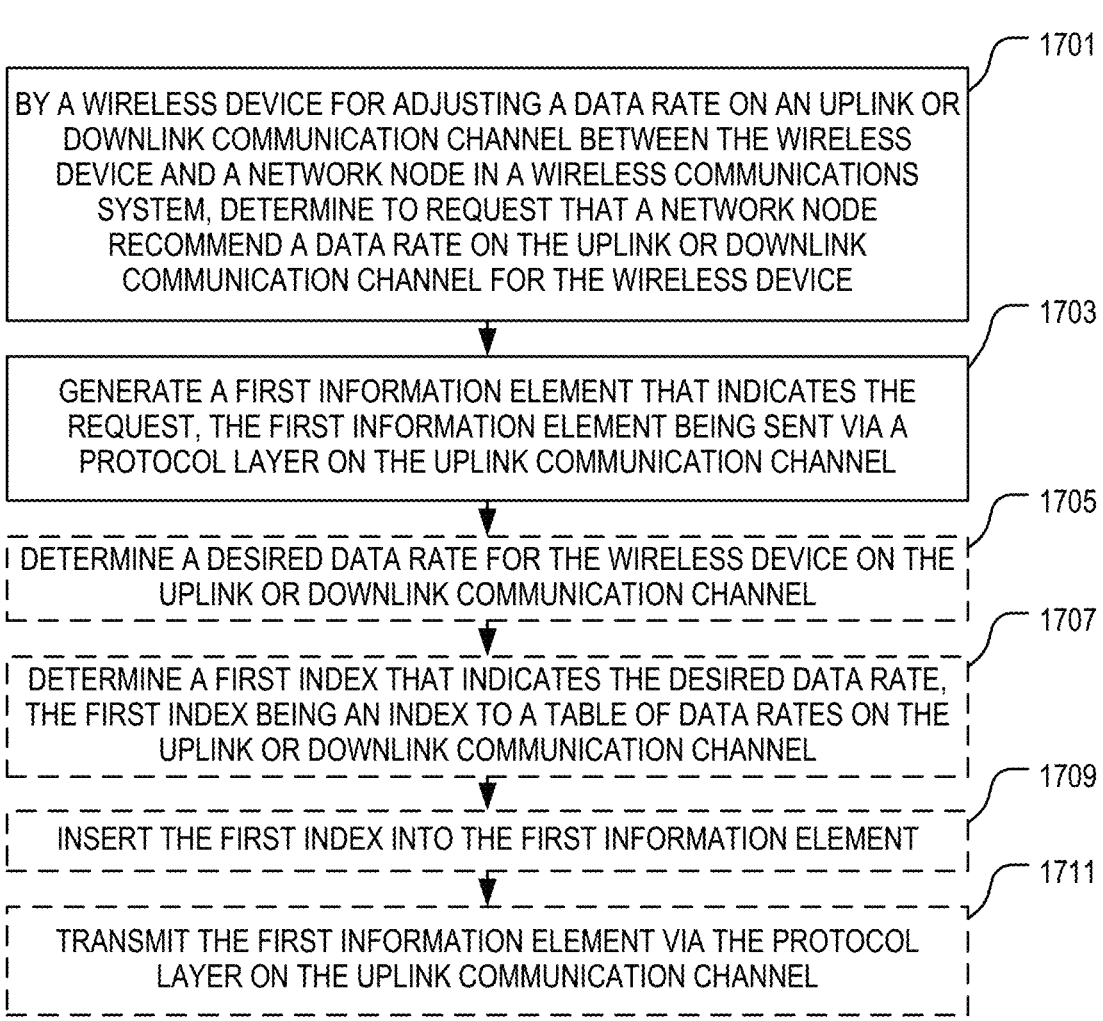
FIG. 17 illustrates another embodiment of a method performed by a wireless device for recommending a data rate in a wireless communications system in accordance with various aspects as described herein.

FIG. 17 illustrates another embodiment of a method 1700 performed by a wireless device for recommending a data rate in a wireless communications system in accordance with various aspects as described herein. In FIG. 17, the method 1700 may start, for instance, at block 1701, where it includes determining to request that a network node recommend a data rate on an uplink or downlink communication channel for the wireless device. At block 1703, the method includes generating a first information element that indicates the request. Further, the first information element is sent via a protocol layer on the uplink communication channel. At block 1705, the method 1700 may include determining a desired data rate for the wireless device on the uplink or downlink communication channel. At block 1707, the method 1700 may include determining a first index that indicates the desired data rate. Also, the first index may be an index to a table of data rates (e.g., FIGS. 15-16) on the uplink or downlink communication channel. At block 1709, the method 1700 may include inserting the first index into the first information element. At block 1711, the method 1700 may include transmitting the first information element having the request via the protocol layer on the uplink communication channel.

Figure 18:
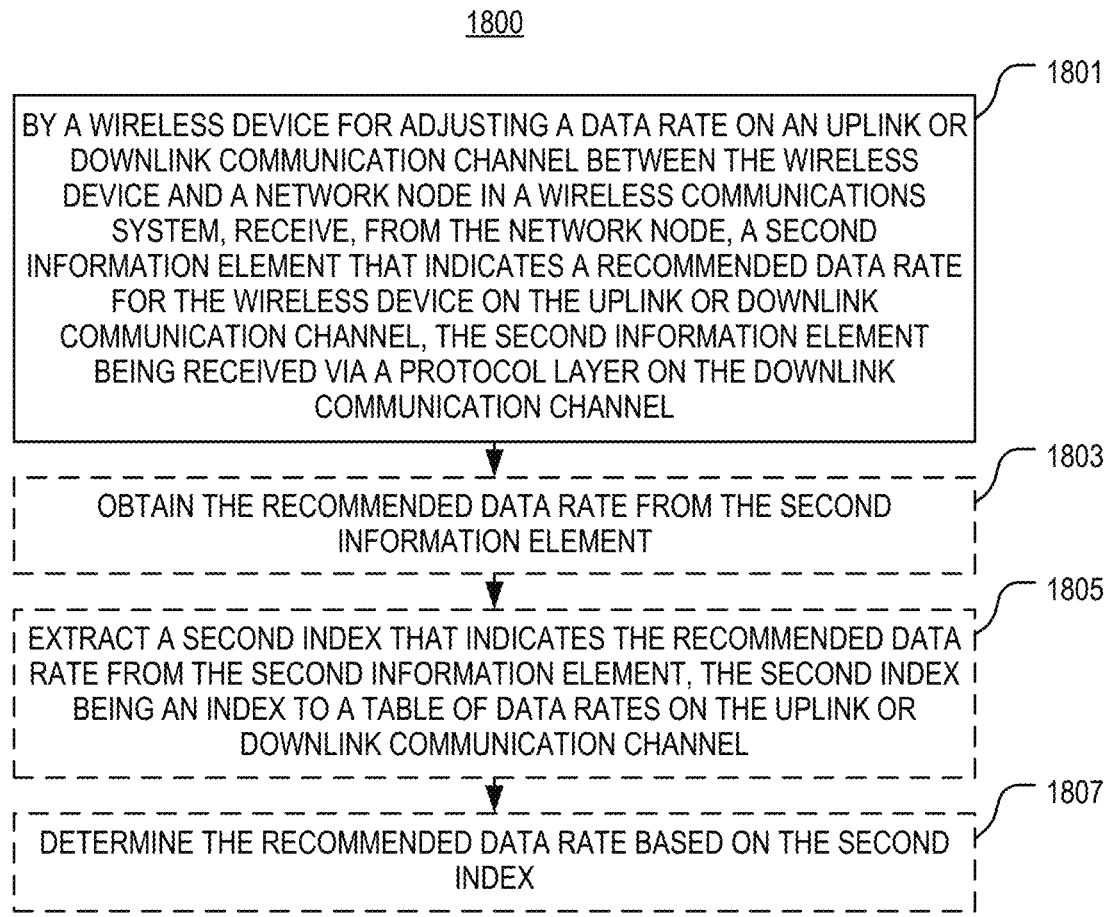
FIG. 18 illustrates another embodiment of a method performed by a wireless device for recommending a data rate in a wireless communications system in accordance with various aspects as described herein.

FIG. 18 illustrates another embodiment of a method 1800 performed by a wireless device for recommending a data rate in a wireless communications system in accordance with various aspects as described herein. In FIG. 18, the method 1800 may start, for instance, at block 1801 where it includes receiving, from a network node, a second information element that indicates a recommended data rate for the wireless device on the uplink or downlink communication channel. Further, the second information element is received via a protocol layer on the downlink communication channel. At block 1803, the method 1800 may include obtaining the recommended data rate from the second information element. At block 1805, the method 1800 may include extracting a second index that indicates the recommended data rate from the second information element. Also, the second index may be an index to a table of data rates (e.g., FIGS. 15-16) on the uplink or downlink communication channel. At block 1807, the method 1800 may include determining the recommended data rate based on the second index.

FIG. 19 illustrates another embodiment of a method 1900 performed by a network node for recommending a data rate in a wireless communications system in accordance with various aspects as described herein. In FIG. 19, the method 1900 may start, for instance, at block 1901 where it includes receiving, from a wireless device, a first information element that indicates a request for a recommended data rate by the wireless device on an uplink or downlink communication channel. Further, the first information element is sent via the protocol layer on the uplink communication channel. At block 1903, the method 1900 may include obtaining the request for the recommended data rate from the first information element. At block 1905, the method 1900 may include extracting a first index from the first information element. The first index may indicate a desired data rate for the wireless device on the uplink or downlink communication channel. Also, the first index may be an index to a table of data rates (e.g., FIGS. 15-16) on the uplink or downlink communication channel. At block 1907, the method 1900 may include determining the desired data rate based on the first index. At block 1909, the method 1900 may include determining the recommended data rate based on the desired data rate. At block 1911, the method 1900 may include generating a second information element that indicates the recommended data rate. The second information element having the recommended data rate may be sent to the wireless device via a protocol layer on the downlink communication channel. At block 1913, the method 1900 may include transmitting, to the wireless device, the second information element having the recommended data rate via the protocol layer on the downlink communication channel In one embodiment, a method performed by a wireless device for recommending a data rate on an uplink or downlink communication channel between the wireless device and a network node in a wireless communications system includes determining to request that the network node recommend a data rate on the uplink or downlink communication channel for the wireless device. Further, the method includes generating an information element that indicates the request. The information element is sent via a protocol layer on the uplink communication channel.

In another embodiment, the method may include transmitting the information element via the protocol layer on the uplink communication channel.

In one embodiment, a wireless device for recommending a data rate on an uplink or downlink communication channel between the wireless device and a network node in a wireless communications system may include a controller. The controller is configured to determine to request that the network node recommend a data rate on the uplink or downlink communication channel for the wireless device. The controller is also configured to generate an information element that indicates the request. The information element is sent via a protocol layer on the uplink communication channel.

In another embodiment, the wireless device may include a transmitter. The transmitter may be operationally coupled to the controller circuit and may be configured to transmit the information element via the protocol layer on the uplink communication channel.

In one embodiment, a wireless device for recommending a data rate on an uplink or downlink communication channel between the wireless device and a network node in a wireless communications system is configured to determine to request that the network node recommend a data rate on the uplink or downlink communication channel for the wireless device. Further, the wireless device is configured to generate an information element that indicates the request. The information element is sent via a protocol layer on the uplink communication channel.

In another embodiment, the wireless device may be further configured to transmit the information element via the protocol layer on the uplink communication channel.

In one embodiment, a wireless device for recommending a data rate on an uplink or downlink communication channel between the wireless device and a network node in a wireless communications system comprises means for determining to request that the network node recommend a data rate on the uplink or downlink communication channel for the wireless device. The wireless device also includes means for generating an information element that indicates the request. The information element is sent via a protocol layer on the uplink communication channel.

In another embodiment, the wireless device may also include means for transmitting the information element via the protocol layer on the uplink communication channel.

In one embodiment, a computer program comprising instructions which, when executed by at least one controller circuit of a wireless device, causes the wireless device to determine to request that the network node recommend a data rate on the uplink or downlink communication channel for the wireless device. Further, the computer program causes the wireless device to generate an information element that indicates the request. The information element is sent via a protocol layer on the uplink communication channel.

In another embodiment, the computer program may cause the wireless device to transmit the information element via the protocol layer on the uplink communication channel.

In another embodiment, a carrier containing the computer program may be one of an electronic signal, optical signal, radio signal, or computer readable storage medium.

In one embodiment, a method performed by a wireless device for recommending a data rate on an uplink or downlink communication channel between the wireless device and a network node in a wireless communications system comprises determining a recommended data rate on the uplink or downlink communication channel based on data rate information for the associated communication channel obtained from an information element received via a protocol layer on the downlink communication channel from the network node. The method may also include generating an information element that indicates the recommended data rate. The information element is sent via the protocol layer on the uplink communication channel to the network node. Further, the recommended data rate is used by the network node to adjust the data rate for the associated communication channel.

In another embodiment, the method may include transmitting, to the network node, the information element via the protocol layer on the uplink communication channel.

In another embodiment, the method may include receiving, from the network node, the information element via the protocol layer on the downlink communication channel.

In one embodiment, a wireless device for recommending a data rate on an uplink or downlink communication channel between the wireless device and a network node in a wireless communications system comprises a controller. The controller is configured to determine a recommended data rate on the uplink or downlink communication channel based on data rate information for the associated communication channel obtained from an information element received via a protocol layer on the downlink communication channel from the network node. The controller is further configured to generate an information element that indicates the recommended data rate. The information element is sent via the protocol layer on the uplink communication channel to the network node. Further, the recommended data rate is used by the network node to adjust the data rate for the associated communication channel.

In another embodiment, the wireless device may include a transmitter. The transmitter may be operationally coupled to the controller circuit and may be configured to transmit the information element via the protocol layer on the uplink communication channel.

In one embodiment, a wireless device for recommending a data rate on an uplink or downlink communication channel between the wireless device and a network node in a wireless communications system is configured to determine a recommended data rate on the uplink or downlink communication channel based on data rate information for the associated communication channel obtained from an information element received via a protocol layer on the downlink communication channel from the network node. Further, the wireless device is configured to generate an information element that indicates the recommended data rate. The information element is sent via the protocol layer on the uplink communication channel to the network node. Further, the recommended data rate is used by the network node to adjust the data rate for the associated communication channel.

In another embodiment, the wireless device may be configured to transmit the information element via the protocol layer on the uplink communication channel.

In one embodiment, a wireless device for recommending a data rate on an uplink or downlink communication channel between the wireless device and a network node in a wireless communications system comprises means for determining a recommended data rate on the uplink or downlink communication channel based on data rate information for the associated communication channel obtained from an information element received via a protocol layer on the downlink communication channel from the network node. The wireless device also comprises means for generating an information element that indicates the recommended data rate. The information element is sent via the protocol layer on the uplink communication channel to the network node. Further, the recommended data rate is used by the network node to adjust the data rate for the associated communication channel.

In another embodiment, the wireless device may also comprise means for transmitting the information element via the protocol layer on the uplink communication channel.

In another embodiment, a computer program comprising instructions which, when executed by at least one controller circuit of a wireless device, causes the wireless device to determine a recommended data rate on the uplink or downlink communication channel based on data rate information for the associated communication channel obtained from an information element received via a protocol layer on the downlink communication channel from the network node. Further, the computer program causes the wireless device to generate an information element that indicates the recommended data rate. The information element is sent via the protocol layer on the uplink communication channel to the network node. Further, the recommended data rate is used by the network node to adjust the data rate for the associated communication channel.

In another embodiment, a carrier containing the computer program may be one of an electronic signal, optical signal, radio signal, or computer readable storage medium.

In one embodiment, a method performed by a network node for recommending a data rate on an uplink or downlink communication channel between the network node and a wireless device in a wireless communications system includes determining a recommended data rate for the wireless device on the uplink or downlink communication channel. The method also includes generating a first information element that indicates the recommended data rate.

The first information element is sent to the wireless device via a protocol layer on the downlink communication channel.

In another embodiment, the method may include transmitting, to the wireless device, the information element via the protocol layer on the downlink communication channel.

In another embodiment, the method may include receiving, from the wireless device, a second information element that indicates a request for the recommended data rate by the wireless device on the uplink or downlink communication channel. The second information element may be sent via the protocol layer on the uplink communication channel. Further, the method may include extracting the request from the second information element. In addition, the step of determining the recommended data rate for the wireless device on the uplink or downlink communication channel may be responsive to receiving the request.

In one embodiment, a network node for recommending a data rate on an uplink or downlink communication channel between the network node and a wireless device in a wireless communications system comprises a controller circuit. The controller circuit is configured to determine a recommended data rate for the wireless device on the uplink or downlink communication channel. The controller circuit is also configured to generate a first information element that indicates the recommended data rate. Further, the first information element is sent via a protocol layer on the downlink communication channel to the wireless device.

In another embodiment, the wireless device may further comprise a transmitter. The transmitter may be operationally coupled to the controller circuit and may be configured to transmit, to the wireless device, the first information element via the protocol layer on the downlink communication channel.

In another embodiment, the wireless device may further comprise a receiver. The receiver may be operationally coupled to the controller circuit and may be configured to receive, from the wireless device, a second information element that indicates a request for the recommended data rate on the uplink or downlink communication channel. Further, the second information element may be sent via the protocol layer on the uplink communication channel. The controller circuit may be further configured to extract the request from the second information element. In addition, the controller may be further configured to perform the step of determining the recommended data rate for the wireless device on the uplink or downlink communication channel responsive to receiving the request.

In another embodiment, a network node for recommending a data rate on an uplink or downlink communication channel between the network node and a wireless device in a wireless communications system is configured to determine a recommended data rate for the wireless device on the uplink or downlink communication channel. The network node is further configured to generate a first information element that indicates the recommended data rate. Also, the first information element is sent via a protocol layer on the downlink communication channel to the wireless device.

In another embodiment, the network node may be further configured to transmit, to the wireless device, the first information element via the protocol layer on the downlink communication channel.

In another embodiment, the network node may be further configured to receive, from the wireless device, a second information element that indicates a request for the recommended data rate on the uplink or downlink communication channel. Also, the second information element may be sent via the protocol layer on the uplink communication channel. The network node may be further configured to extract the request from the second information element. In addition, the network node may be configured to determine the recommended data rate for the wireless device on the uplink or downlink communication channel response to receiving the request.

In one embodiment, a network node for recommending a data rate on an uplink or downlink communication channel between the network node and a wireless device in a wireless communications system, the network node comprises means for determining a recommended data rate on the uplink or downlink communication channel. The wireless device further comprises means for generating a first information element that indicates the recommended data rate, wherein the first information element is sent via a protocol layer on the downlink communication channel.

In another embodiment, the wireless device may further comprise means for transmitting the first information element via the protocol layer on the downlink communication channel.

In another embodiment, the wireless device may further comprise means for receiving, from the wireless device, a second information element that indicates a request for the recommended data rate on the uplink or downlink communication channel. The second information element may be sent via the protocol layer on the uplink communication channel. The wireless device may further comprise means for extracting the request from the second information element. The wireless device may further comprise determining the recommended data rate on the uplink or downlink communication channel responsive to receiving the request.

In one embodiment, a computer program comprising instructions which, when executed by at least one controller circuit of a network node, causes the network node to determine a recommended data rate for the wireless device on the uplink or downlink communication channel. The computer program further causes the network node to generate a first information element that indicates the recommended data rate. Also, the first information element is sent via a protocol layer on the downlink communication channel to the wireless device.

In another embodiment, a carrier containing the computer program may be one of an electronic signal, optical signal, radio signal, or computer readable storage medium.

In another embodiment, the protocol layer may be the Medium Access Control (MAC) layer or the Packet Data Convergence Protocol (PDCP) layer.

| ABBREVIATIONS: | |
|---|---|
| Abbreviation | Explanation |
| 3GPP | 3rd Generation Partnership Project |
| BS | Base Station |
| BSR | Buffer Status Report |
| CDMA | Code Division Multiple Access |
| CP | Cyclic Prefix |
| CRC | Cyclic Redundancy Check |
| CRS | Cell Specific Reference Signal |
| CSI | Channel State Information |
| CSS | Common Search Space |
| DL | Downlink |
| DFT | Discrete Fourier Transform |
| eNB | Evolved Node B (i.e., base station) |
| E-UTRA | Evolved Universal Terrestrial Radio Access |
| E-UTRAN | Evolved Universal Terrestrial Radio Access Network |

-continued

| ABBREVIATIONS: | |
|---|---|
| Abbreviation | Explanation |
| EVS | Enhanced Voice Service |
| FDD | Frequency Division Duplex |
| GSMA | Global System for Mobile communications (GSM) Association |
| IFFT | Inverse Fast Fourier Transform |
| IE | Information Element |
| IoT | Internet of Things |
| IMS | IP Multimedia System |
| IP | Internet Protocol |
| LTE | Long Term Evolution |
| MBSFN | Multimedia Broadcast Single Frequency Network |
| MIB | Master Information Block |
| MIMO | Multiple Input Multiple Output |
| MSR | Multi-Standard Radio |
| MTC | Machine-Type Communication |
| NW | Network |
| OFDM | Orthogonal Frequency Division Modulation |
| OFDMA | Orthogonal Frequency Division Modulation Access |
| PA | Power Amplifier |
| PAPR | Peak-to-Average Power Ratio |
| PBCH | Physical Broadcast Channel |
| PDCCH | Physical Data Control Channel |
| PDCP | Physical Layer Convergence Procedure |
| PDU | Protocol Data Unit |
| PHR | Power Headroom Report |
| PRACH | Physical Random Access Channel |
| PRS | Positioning Reference Signal |
| PRB | Physical Resource Block |
| PRD | Permanent Reference Document |
| PSD | Power Spectral Density |
| PSS | Primary Synchronization Sequence |
| PUSCH | Physical Uplink Shared Channel |
| RACH | Random Access Channel |
| RAN | Radio Access Network |
| RAT | Radio Access Technology |
| RF | Radio Frequency |
| RLC | Radio Link Control |
| RRC | Radio Resource Control |
| RTP | Real-time Transport Protocol |
| SoC | System-on-a-Chip |
| SC-FDMA | Single-Carrier, Frequency Division Multiple Access |
| SFBC | Space Frequency Block Coding |
| SI | System Information |
| SIB | System Information Block |
| SIM | Subscriber Identity Module or Subscriber Identification Module |
| SNR | Signal to Noise Ratio |
| SRS | Sounding Reference Signal |
| SSS | Secondary Synchronization Sequence |
| TDD | Time Division Duplex |
| Tx | Transmitter |
| UE | User Equipment |
| UL | Uplink |
| ULSCH | UpLink Shared CHannel |
| USS | UE-specific Search Space |
| UMTS | Universal Mobile Telecommunications Service |
| UTRAN | UMTS Terrestrial Radio Access Network |
| VoLTE | Voice over LTE service |
| WB-LTE | Wideband LTE (i.e., corresponds to legacy LTE) |
| WCDMA | Wideband CDMA |
| ZC | Zadoff-Chu algorithm |

The previous detailed description is merely illustrative in nature and is not intended to limit the present disclosure, or the application and uses of the present disclosure. Furthermore, there is no intention to be bound by any expressed or implied theory presented in the preceding field of use, background, summary, or detailed description. The present disclosure provides various examples, embodiments and the like, which may be described herein in terms of functional or logical block elements. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Furthermore, the various aspects described herein may be implemented using standard programming or engineering techniques to produce software, firmware, hardware (e.g., circuits), or any combination thereof to control a computing device to implement the disclosed subject matter. It will be appreciated that some embodiments may be comprised of one or more generic or specialized processors such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods, devices and systems described herein. Alternatively, some or all functions could be implemented by a state machine that has no stored program instructions, or in one or more application specific integrated circuits (ASICs), in which each function or some combinations of certain of the functions are implemented as custom logic circuits. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the subject matter of this disclosure.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

What is claimed is:

1. A method performed by a wireless device for recommending a data rate on a downlink communication channel between the wireless device and a network node in a wireless communications system, comprising:
   determining to request that the network node recommend a data rate on the downlink communication channel for the wireless device;
   generating a first information element that indicates the request, wherein the first information element includes a first index that indicates a desired data rate, wherein the first index is an index to a table of data rates on the downlink communication channel;
   transmitting, to the network node, the first information element that indicates the request via a protocol layer on the uplink communication channel;
   in response to said transmitting the first information element that indicates the request, receiving, from the network node, a second information element that indicates the recommended data rate for the wireless device on the downlink communication channel, the second information element being received via the protocol layer on a downlink communication channel;
   extracting a second index that indicates the recommended data rate from the second information element, wherein the second index is an index to the table of data rates on the downlink communication channel; and
   determining the recommended data rate based on the second index.

2. The method of claim 1, further comprising:
   determining the desired data rate for the wireless device on the downlink communication channel.

3. The method of claim 2, wherein said generating includes:
   determining the first index that indicates the desired data rate; and
   inserting the first index into the first information element.

4. The method of claim 1, wherein the first information element is a medium access control (MAC) control element (CE).

5. The method of claim 1, wherein the first information element includes an indication of an identity of a logical channel for which the recommended data rate applies.

6. The method of claim 1, wherein the second information element is a medium access control (MAC) control element (CE).

7. The method of claim 1, wherein the second information element includes an indication of an identity of a logical channel for which the recommended data rate applies.

8. The method of claim 1, wherein one index in the table indicates a release of a previous data rate recommendation on the downlink communication channel for the wireless device.

9. The method of claim 1, wherein one index in the table indicates that no data rate recommendation on the downlink communication channel for the wireless device is available.

10. The method of claim 1, wherein a plurality of consecutive indices in the table represents logarithmically-spaced data rates.

11. The method of claim 1, wherein the protocol layer is a medium access control (MAC) layer.

12. A wireless device for recommending a data rate on a downlink communication channel between the wireless device and a network node in a wireless communications system (100), the wireless device comprising:
   communication circuitry for communicating with a base station in the wireless communication network; and
   processing circuitry configured to:
      determine to request that the network node recommend a data rate on the downlink communication channel for the wireless device;
      generate a first information element that indicates the request, wherein the first information element includes a first index that indicates a desired data rate, wherein the first index is an index to a table of data rates on the downlink communication channel;
      transmitting the first information element that indicates the request via a protocol layer on the downlink communication channel;
      in response to said transmitting the first information element that indicates the request, receiving, from the network node, a second information element that indicates the recommended data rate for the wireless device on the downlink communication channel, the second information element being received via the protocol layer on a downlink communication channel;
      extract a second index that indicates the recommended data rate from the second information element, wherein the second index is an index to the table of data rates on the downlink communication channel; and
      determine the recommended data rate based on the second index.

13. The wireless device of claim 12, configured to perform determining the desired data rate for the wireless device on the downlink communication channel.

14. A method performed by a network node for recommending a data rate on a downlink communication channel between the network node and a wireless device in a wireless communications system, comprising:
   receiving, from the wireless device, a first information element that indicates a request for the recommended data rate by the wireless device on the downlink communication channel, the first information element being sent via the protocol layer on the uplink communication channel;
   extracting a first index that indicates a desired data rate from the first information element, wherein the first index is an index to a table of data rates on the downlink communication channel;
   determining the desired data rate based on the first index;
   responsive to said receiving the first information element, determining a recommended data rate for the wireless device on the downlink communication channel based on the desired data rate;
   generating a second information element that indicates the recommended data rate; and transmitting, to the wireless device, the second information element via the protocol layer on a downlink communication channel, wherein said generating the second information element includes:

determining a second index that indicates the recommended data rate, wherein the second index is an index to the table of data rates on the downlink communication channel; and inserting the second index into the second information element.

15. A network node for recommending a data rate on a downlink communication channel between the network node and a wireless device in a wireless communications system, the network node comprising:

communication circuitry for communicating with a base station in the wireless communication network; and processing circuitry configured to:

receive, from the wireless device, a first information element that indicates a request for the recommended data rate by the wireless device on the uplink communication channel, the first information element being sent via the protocol layer on the uplink communication channel;

extract a first index that indicates a desired data rate from the first information element, wherein the first index is an index to a table of data rates on the downlink communication channel;

determine the desired data rate based on the first index;

responsive to said receiving the first information element, determine a recommended data rate for the wireless device on the downlink communication channel based on the desired data rate; and generate a second information element that indicates the recommended data rate, wherein the second information element is sent via a protocol layer on a downlink communication channel to the wireless device including determining a second index that indicates the recommended data rate, wherein the second index is an index to the table of data rates on the downlink communication channel; and inserting the second index into the second information element.

* * * * *

UNITED STATES PATENT AND TRADEMARK OFFICE
CERTIFICATE OF CORRECTION

| | | |
|---|---|---|
| PATENT NO. | : 11,304,099 B2 | Page 1 of 1 |
| APPLICATION NO. | : 16/841366 | |
| DATED | : April 12, 2022 | |
| INVENTOR(S) | : Yavuz et al. | |

It is certified that error appears in the above-identified patent and that said Letters Patent is hereby corrected as shown below:

In the Specification

In Column 1, Line 9, delete "2018," and insert -- 2018, now U.S. Pat. No. 10,659,995, --, therefor.

In the Claims

In Column 28, Line 13, in Claim 12, delete "system (100)," and insert -- system, --, therefor.

Signed and Sealed this
Fourteenth Day of March, 2023

Katherine Kelly Vidal
*Director of the United States Patent and Trademark Office*